US011395331B2

(12) United States Patent
Li et al.

(10) Patent No.: US 11,395,331 B2
(45) Date of Patent: Jul. 19, 2022

(54) RANDOM ACCESS METHOD, TERMINAL DEVICE, AND NETWORK DEVICE

(71) Applicant: Huawei Technologies Co., Ltd., Shenzhen (CN)

(72) Inventors: Xiaoxian Li, Shenzhen (CN); Ping Fang, Shenzhen (CN); Yong Cheng, Shenzhen (CN); Gaokun Pang, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 107 days.

(21) Appl. No.: 16/628,898

(22) PCT Filed: Aug. 1, 2017

(86) PCT No.: PCT/CN2017/095489
§ 371 (c)(1),
(2) Date: Jan. 6, 2020

(87) PCT Pub. No.: WO2019/006807
PCT Pub. Date: Jan. 10, 2019

(65) Prior Publication Data
US 2020/0374921 A1    Nov. 26, 2020

(30) Foreign Application Priority Data
Jul. 7, 2017  (CN) .......................... 201710552313.1

(51) Int. Cl.
*H04W 74/00*    (2009.01)
*H04W 76/11*    (2018.01)
(Continued)

(52) U.S. Cl.
CPC ....... *H04W 74/008* (2013.01); *H04L 61/6054* (2013.01); *H04W 8/26* (2013.01);
(Continued)

(58) Field of Classification Search
CPC ........... H04W 74/008; H04W 74/0833; H04W 76/11; H04W 8/26; H04W 16/28;
(Continued)

(56) References Cited

U.S. PATENT DOCUMENTS

2009/0318149 A1* 12/2009 Xing ..................... H04W 48/20
                                                           455/436
2011/0249635 A1* 10/2011 Chen ................... H04W 74/002
                                                           370/329
(Continued)

FOREIGN PATENT DOCUMENTS

CN    104956606 A    9/2015
CN    105308879 A    2/2016
(Continued)

OTHER PUBLICATIONS

Qualcomm Incorporated, "Consideration on NR paging," 3GPP TSG-RAN2 Meeting NR Ad Hoc #2, R2-1706882, Qingdao, China, Jun. 27-29, 2017, total 6 pages.
(Continued)

*Primary Examiner* — Ricardo H Castaneyra
(74) *Attorney, Agent, or Firm* — Conley Rose, P.C.

(57) ABSTRACT

A random access method includes determining a physical channel resource and a preamble sequence, where the physical channel resource or the preamble sequence is associated with a first beam determined by the terminal device and used by a network device for performing downlink transmission, sending the preamble sequence on the physical channel resource, receiving a random access response message and a paging message, where the random access response message includes a preamble identifier, the paging message includes first identification information of one or more to-be-paged terminal devices, and the paging message is sent on the first beam, sending a second identifier of the terminal device when the preamble identifier corresponds to
(Continued)

the preamble sequence, and a first identifier of the terminal device matches the first identification information, receiving first indication information, and determining, based on the first indication information to complete a random access procedure.

20 Claims, 10 Drawing Sheets

(51) Int. Cl.
*H04L 101/654* (2022.01)
*H04W 8/26* (2009.01)
*H04W 16/28* (2009.01)
*H04W 68/00* (2009.01)
*H04W 72/04* (2009.01)
*H04W 74/08* (2009.01)
*H04W 80/02* (2009.01)

(52) U.S. Cl.
CPC ......... *H04W 16/28* (2013.01); *H04W 68/005* (2013.01); *H04W 72/046* (2013.01); *H04W 72/0466* (2013.01); *H04W 74/0833* (2013.01); *H04W 76/11* (2018.02); *H04W 80/02* (2013.01)

(58) Field of Classification Search
CPC . H04W 68/005; H04W 68/02; H04W 72/046; H04W 72/0446; H04W 80/02; H04L 61/6054
See application file for complete search history.

(56) References Cited

U.S. PATENT DOCUMENTS

| | | | | |
|---|---|---|---|---|
| 2014/0204843 | A1* | 7/2014 | Larsson | H04L 5/0094 370/329 |
| 2015/0382205 | A1* | 12/2015 | Lee | H04L 5/0048 370/329 |
| 2017/0230951 | A1* | 8/2017 | Xiong | H04W 4/70 |
| 2017/0367069 | A1* | 12/2017 | Agiwal | H04W 68/025 |
| 2018/0351624 | A1* | 12/2018 | Hakola | H04B 7/0632 |

FOREIGN PATENT DOCUMENTS

| | | |
|---|---|---|
| CN | 106357365 A | 1/2017 |
| CN | 106686729 A | 5/2017 |
| WO | 2016086144 A1 | 6/2016 |
| WO | 2017019246 A1 | 2/2017 |

OTHER PUBLICATIONS

Samsung, "4-step RACH procedure discussion," R1-1710636, 3GPP TSG RAN WG1 Meeting NR AH #2, Qingdao, China, Jun. 27-30, 2017, 14 pages.
Nokia, et al., "NR 4-step RACH pracedure," R1-1710892, 3GPP TSG RAN WG1 NR Ad-Hoc#2, Qingdao, China, Jun. 27-30, 2017, 10 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, V14.3.0, Jun. 2017, 331 pages.
"3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304, 714.3.0, Jun. 2017, 49 pages.
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321, V14.3.0, Jun. 2017, 107 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.2.2, Apr. 2017, 713 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.3.0, Jun. 2017, 195 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.3.0, Jun. 2017, 460 pages.
ZTE, "Paging design in NR," R1-1707047, 3GPP TSG RAN WG1 Meeting #89, Hangzhou, China, May 15-19, 2017, 7 pages.
NTT Docomo, Inc., "Discussion on paging design for NR," R1-1708441, 3GPP TSG RAN WG1 Meeting #89, Hangzhou, P.R. China, May 15-19, 2017, 5 pages.

* cited by examiner

RANDOM ACCESS METHOD, TERMINAL DEVICE, AND NETWORK DEVICE

CROSS-REFERENCE TO RELATED APPLICATIONS

This application is a U.S. National Stage of International Patent Application No. PCT/CN2017/095489 filed on Aug. 1, 2017, which claims priority to Chinese Patent Application No. 201710552313.1 filed on Jul. 7, 2017. Both of the aforementioned applications are hereby incorporated by reference in their entireties.

TECHNICAL FIELD

This application relates to the communications field, and more specifically, to a random access method, a terminal device, and a network device.

BACKGROUND

A network device in a 5th generation (5th Generation, 5G) mobile communications technology (Mobile Communication Technology) may interact with a terminal device by using a beamforming (Beamforming) technology. The network device may usually form a plurality of downlink transmit beams (Downlink Transmission Beam, DL Tx Beam), and send, on one or more transmit beams (that is, downlink transmit beams), a downlink signal to a terminal device within a coverage area of each transmit beam. The terminal device may receive the downlink signal by using a receive beam (Receiving Beam, Rx Beam) or an omnidirectional antenna, to obtain a relatively large array gain.

In the prior art, when there is no service interaction between the terminal device and the network device for a long time, the terminal device may enter an idle mode. When the network device needs to send data to the terminal device, the network device sends a paging message (Paging Message) at a specific moment in a paging cycle. Correspondingly, the terminal device listens to, at the specific moment in the paging cycle, the paging message sent by the network device, and enters a sleep mode in other time periods, to save electric energy.

The network device cannot determine transmit beams under which a pageable terminal device within a downlink transmission coverage area of the network device is located. Therefore, to enable all pageable terminal devices to successfully access the paging message, the network device needs to send the paging message on each beam through sweeping. However, there may be no to-be-paged device under specific beams, consequently causing a waste of resources.

In existing standard discussion, it is proposed that the terminal device reports an optimal downlink transmit beam (Best Tx beam) to the network device, so that the network device can learn of transmit beams under which a to-be-paged terminal device is specifically located, and the network device may send the paging message only on these transmit beams, thereby reducing system overheads. However, after reporting the optimal downlink transmit beam, the terminal device needs to first receive the paging message and determine that the terminal device is paged, and then performs random access, resulting in a relatively large access delay.

SUMMARY

This application provides a random access method, a terminal device, and a network device, so as to reduce a transmission delay and signaling overheads.

According to a first aspect, a random access method is provided, including:

determining, by a terminal device, a physical channel resource and a preamble sequence, where the physical channel resource and/or the preamble sequence are/is associated with a first beam that can be used by a network device for performing downlink transmission with the terminal device and that is determined by the terminal device;

sending, by the terminal device, the preamble sequence to the network device on the physical channel resource;

receiving, by the terminal device, a random access response message and a paging message that are sent by the network device, where the random access response message includes uplink resource indication information and a preamble identifier, the paging message includes first identification information of one or more to-be-paged terminal devices, and the paging message is sent on the first beam;

when the preamble identifier is corresponding to the preamble sequence, and a first identifier of the terminal device matches the first identification information, sending, by the terminal device, a second identifier of the terminal device to the network device, where the second identifier of the terminal device is sent on an uplink resource indicated by the uplink resource indication information;

receiving, by the terminal device, first indication information sent by the network device; and determining, by the terminal device based on the first indication information, to complete a random access procedure.

According to the random access method in this embodiment of this application, the terminal device reports a beam (that is, the terminal device reports an optimal downlink transmit beam) by using a physical random access channel (Physical Random Access Channel, PRACH) resource (that is, the physical channel resource) or the preamble sequence, receives the paging message in a subsequent process, determines that the terminal device is paged, and after determining that the terminal device is paged, may continue to complete the random access procedure. Compared with the prior art in which a terminal device initiates a random access procedure after determining that the terminal device is paged, this method can speed up the random access procedure of the paged LIE, thereby reducing a transmission delay and signaling overheads. On the other hand, the network device sends the paging message only on the beam (that is, the first beam) reported by the terminal device, instead of sending the paging message on each beam through sweeping, thereby reducing resource overheads used by the network device for sending the paging message.

In a possible implementation, that a first identifier of the terminal device matches the first identification information includes:

the first identification information is a system architecture evolution (System Architecture Evolution, SAE)—temporary mobile subscriber identity (SAE-Temporary Mobile Subscriber Identity. S-TMSI), the first identifier is an S-TMSI of the terminal device, and the S-TMSI of the terminal device is identical to one of at least one S-TMSI of the one or more to-be-paged terminal devices; or the first identification information is an international mobile subscriber identity IMSI, the first identifier is an international mobile subscriber identity (International Mobile Subscriber Identity, IMSI) of the terminal device, and the IMSI of the terminal device is identical to one of at least one IMSI of the one or more to-be-paged terminal devices; or the first identification information is a third identifier generated based on S-TMSI and according to a first algorithm, the first identifier is an S-TMSI of the terminal device, and a fourth identifier generated based on the S-TMSI of the terminal device and according to the first algorithm is identical to one of at least one third identifier of the one or more to-be-paged terminal devices; or the first identification information is a fifth identifier generated based on an IMSI and according to a second algorithm, the first identifier is an IMSI of the terminal device, and a sixth identifier generated based on the IMSI of the terminal device and according to the second algorithm is identical to one of at least one fifth identifier of the one or more to-be-paged terminal devices.

Optionally, the first algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

Optionally, the second algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

In a possible implementation, the second identifier is a non-access stratum (Non-access stratum, NAS) identifier of the terminal device; or the second identifier is a system architecture evolution-temporary mobile subscriber identity S-TMSI of the terminal device; or the second identifier is a random number generated by the terminal device; or the second identifier is an international mobile subscriber identity IMSI of the terminal device; or the second identifier is a cell radio network temporary identifier (Cell Radio Network Temporary Identity Temporary, C-RNTI) of the terminal device.

In a possible implementation, the determining, by the terminal device based on the first indication information, to complete a random access procedure includes:

if a user equipment contention resolution identifier included in the first indication information matches the second identifier of the terminal device, determining, by the terminal device, to complete the random access procedure; or if the first indication information is a PDCCH scrambled by the second identifier of the terminal device, determining, by the terminal device, to complete the random access procedure; or if the first indication information is a physical downlink control channel (Physical Downlink Control Channel, PDCCH) scrambled by the second identifier of the terminal device and includes uplink resource indication information used for new transmission, determining, by the terminal device, to complete the random access procedure.

A person skilled in the art may understand that scrambling a PDCCH by the second identifier may be understood as scrambling a CRC code of content in the PDCCH by the second identifier.

In a possible implementation, the determining, by the terminal device based on the first indication information, to complete a random access procedure includes:

receiving, by the terminal device, a first cell radio network temporary identifier C-RNTI sent by the network device; and if a user equipment contention resolution identifier included in the first indication information matches the second identifier of the terminal device, setting, by the terminal device, the first cell radio network temporary identifier as the cell radio network temporary identifier of the terminal device, and determining to complete the random access procedure.

Optionally, the first cell radio network temporary identifier may be carried in the random access response message sent by the network device.

In a possible implementation, the random access response message and the paging message are transmitted on different frequency domain resources within a same time period on a physical downlink shared channel (Physical Downlink Share Channel, PDSCH).

In this case, the terminal device can obtain the random access response message and the paging message within a same time period. This helps the terminal device quickly perform next processing.

In addition, a PDSCH resource in which the random access response message is located and a PDSCH resource in which the paging message is located may be alternatively located in a same frequency domain resource within different time periods. In this case, the terminal device can obtain the random access response message and the paging message within a same bandwidth. This has a relatively low requirement for a bandwidth capability of the terminal device.

In a possible implementation, the receiving, by the terminal device, a random access response message and a paging message that are sent by the network device includes:

monitoring, by the terminal device, a PDCCH that is scrambled by a cyclic redundancy check (Cyclic Redundancy Check, CRC) code by using a random access radio network temporary identifier (Random Access Radio Network Temporary Identity, RA-RNTI), to obtain time-frequency resource information of the random access response message, and monitoring a physical downlink control channel that is scrambled by a cyclic redundancy check code by using a paging radio network temporary identifier (Paging Radio Network Temporary Identity, P_RNTI), to obtain time-frequency resource information of the paging message; and receiving, by the terminal device, the random access response message on a time-frequency resource indicated by the time-frequency resource information of the random access response message, and receiving the paging message on a time-frequency resource indicated by the time-frequency resource information of the paging message.

In a possible implementation, the random access response message and the paging message are carried in a same media access control protocol data unit (Radio Access Control Protocol Data Unit, MAC PDU).

In a possible implementation, a MAC subheader corresponding to the paging message includes a seventh identifier, and the seventh identifier is generated based on the paging radio network temporary identifier P-RNTI.

In other words, if a MAC subheader includes the seventh identifier generated based on the P-RNTI, it can be determined that a payload part corresponding to the MAC subheader includes the paging message.

In a possible implementation, the receiving, by the terminal device, a random access response message and a paging message that are sent by the network device includes:

monitoring, by the terminal device, a physical downlink control channel scrambled by a random access radio network temporary identifier RA-RNTI, to obtain time-frequency resource information of the random access response message and the paging message; and receiving, by the terminal device, the random access response message and the paging message on a time-frequency resource indicated by the time-frequency resource information of the random access response message and the paging message.

According to a second aspect, a random access method is provided, including:

receiving, by a network device on a physical channel resource, a preamble sequence sent by a terminal device;

determining, by the network device based on the physical channel resource and/or the preamble sequence, a first beam that can be used for performing downlink transmission with the terminal device:

sending, by the network device, a random access response message and a paging message to the terminal device, where the random access response message includes uplink resource indication information and a preamble identifier, the paging message includes first identification information of one or more to-be-paged terminal devices, and the paging message is sent on the first beam;

when the preamble identifier is corresponding to the preamble sequence, and a first identifier of the terminal device matches the first identification information, receiving, by the network device, a second identifier sent by the terminal device, where the second identifier of the terminal device is sent on an uplink resource indicated by the uplink resource indication information;

determining, by the network device based on the second identifier, that the terminal device is a to-be-paged terminal device; and sending, by the network device, first indication information to the terminal device, where the first indication information is used by the terminal device for determining to complete a random access procedure.

According to the random access method in this embodiment of this application, the terminal device reports a beam (that is, the terminal device reports an optimal downlink transmit beam) by using a physical random access channel (Physical Random Access Channel, PRACH) resource (that is, the physical channel resource) or the preamble sequence, receives the paging message in a subsequent process, determines that the terminal device is paged, and after determining that the terminal device is paged, may continue to complete the random access procedure. Compared with the prior art in which a terminal device initiates a random access procedure after determining that the terminal device is paged, this method can speed up the random access procedure of the paged UE, thereby reducing a transmission delay and signaling overheads. On the other hand, the network device sends the paging message only on the beam (that is, the first beam) reported by the terminal device, instead of sending the paging message on each beam through sweeping, thereby reducing resource overheads used by the network device for sending the paging message.

In a possible implementation, the first identification information is a system architecture evolution SAE-temporary mobile subscriber identity S-TMSI; or the first identification information is an international mobile subscriber identity IMSI; or the first identification information is information generated based on an S-TMSI and according to a first algorithm; or the first identification information is information generated based on an IMSI and according to a second algorithm.

Optionally, the first algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

Optionally, the second algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

In a possible implementation, the determining, by the network device based on the second identifier, that the terminal device is a to-be-paged terminal device includes:

if the second identifier matches one of at least one non-access stratum NAS identifier, at least one system architecture evolution SAE-temporary mobile subscriber identity S-TMSI, and at least one international mobile subscriber identity IMSI that are of the one or more to-be-paged terminal devices, or the second identifier matches a cell radio network temporary identifier C-RNTI, or the second identifier matches one of one or more random numbers generated by the one or more to-be-paged terminal devices, determining, by the network device, that the terminal device is a to-be-paged terminal device.

In a possible implementation, before the determining, by the network device based on the second identifier, that the terminal device is a to-be-paged terminal device, the method further includes:

sending, by the network device, the second identifier or information generated based on the second identifier to a core network device; and receiving, by the network device, a confirmation message sent by the core network device, where the confirmation message indicates that the terminal device is a to-be-paged terminal device, where the determining, by the network device based on the second identifier, that the terminal device is a to-be-paged terminal device includes:

determining, by the network device based on the confirmation message, that the terminal device is a to-be-paged terminal device.

In a possible implementation, before the determining, by the network device based on the second identifier, that the terminal device is a to-be-paged terminal device, the method further includes:

sending, by the network device, a trigger message to a core network device, where the trigger message is used to trigger the core network device to send paging identification information of a to-be-paged terminal device to the network device; and receiving, by the network device, a confirmation message sent by the core network device, where the confirmation message includes paging identification information of at least one to-be-paged terminal device, where the determining, by the network device based on the second identifier, that the terminal device is a to-be-paged terminal device includes:

if the second identifier matches one piece of the paging identification information of the at least one to-be-paged terminal device, determining, by the network device, that the terminal device is a to-be-paged terminal device.

Optionally, the paging identification information is the same as the first identification information.

In a possible implementation, the first indication information includes a user equipment contention resolution identifier that matches the second identifier of the terminal device; or the first indication information is a PDCCH scrambled by the second identifier of the terminal device; or the first indication information is a PDCCH scrambled by the second identifier of the terminal device and includes uplink resource indication information used for new transmission.

In a possible implementation, the random access response message and the paging message are transmitted on different frequency domain resources within a same time period on a physical downlink shared channel.

In a possible implementation, time-frequency resource information of the random access response message is indicated by a physical downlink control channel that is scrambled by cyclic redundancy check CRC by using a random access radio network temporary identifier RA-RNTI, and time-frequency resource information of the paging message is indicated by a physical downlink control channel that is scrambled by cyclic redundancy check by using a paging radio network temporary identifier P-RNTI.

In a possible implementation, the random access response message and the paging message are carried in a same media access control protocol data unit MAC PDU.

In a possible implementation, a MAC subheader corresponding to the paging message includes a seventh identifier, and the seventh identifier is generated based on the paging radio network temporary identifier P-RNTI.

In a possible implementation, time-frequency resource information of the random access response message and the paging message is indicated by a physical downlink control channel that is scrambled by cyclic redundancy check CRC by using a random access radio network temporary identifier RA-RNTI.

According to a third aspect, a terminal device is provided, and is used to perform the method according to any one of the first aspect or the possible implementations of the first aspect. Specifically, the terminal device includes a unit that is configured to perform the method according to any one of the first aspect or the possible implementations of the first aspect.

According to a fourth aspect, a network device is provided, and is used to perform the method according to any one of the second aspect or the possible implementations of the second aspect. Specifically, the network device includes a unit that is configured to perform the method according to any one of the second aspect or the possible implementations of the second aspect.

According to a fifth aspect, a terminal device is provided. The terminal device includes a transceiver, a memory, and a processor, where the memory is configured to store a computer program, and the processor is configured to invoke the computer program from the memory and run the computer program, so that the system performs the method according to any one of the first aspect or the possible implementations of the first aspect.

According to a sixth aspect, a network device is provided. The network device includes a transceiver, a memory, and a processor, where the memory is configured to store a computer program, and the processor is configured to invoke the computer program from the memory and run the computer program, so that the system performs the method according to any one of the second aspect or the possible implementations of the second aspect.

According to a seventh aspect, a computer readable storage medium is provided, and is configured to store a computer program. The computer program includes an instruction that is used to perform the method according to any one of the first aspect or the possible implementations of the first aspect.

According to an eighth aspect, a computer readable storage medium is provided, and is configured to store a computer program. The computer program includes an instruction that is used to perform the method according to any one of the second aspect or the possible implementations of the second aspect.

According to a ninth aspect, a computer program product including an instruction is provided. When the computer program product runs on a computer, the computer is enabled to perform the method according to any one of the first aspect or the possible implementations of the first aspect.

According to a tenth aspect, a computer program product including an instruction is provided. When the computer program product runs on a computer, the computer is enabled to perform the method according to any one of the second aspect or the possible implementations of the second aspect.

DESCRIPTION OF EMBODIMENTS

Figure 1:
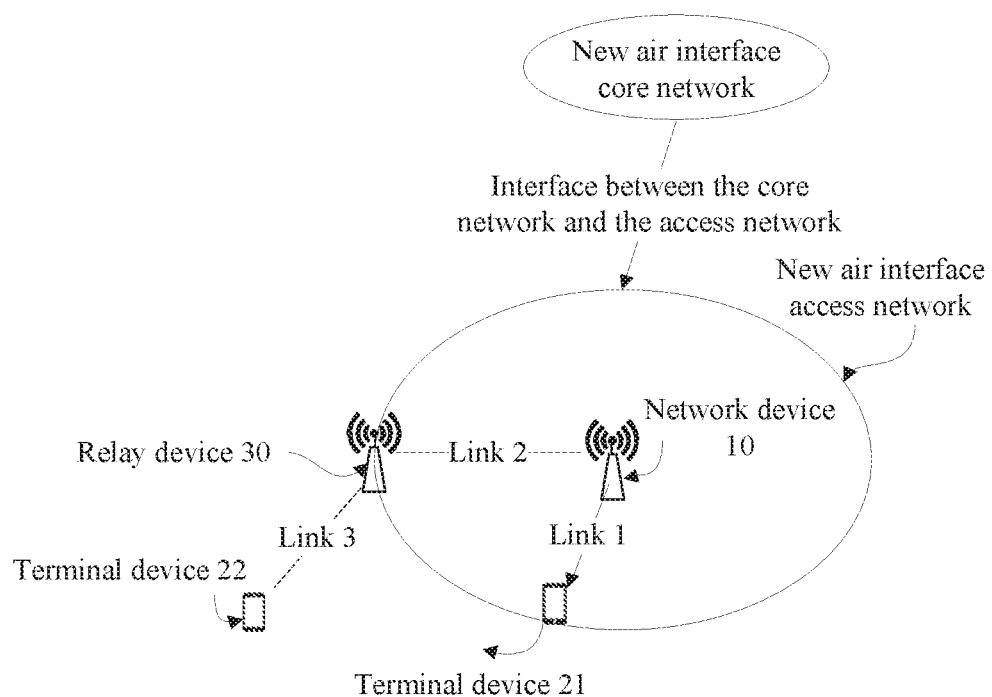
FIG. 1 is a schematic diagram of an application scenario according to an embodiment of this application.

The following describes technical solutions of this application with reference to accompanying drawings.

Before describing the technical solutions of this application, the following first briefly describes a background technology related to paging.

When there is no service interaction between a terminal device and a network device for a long time, the terminal device may enter an idle mode. When the network device needs to send data to the terminal device, the network device sends a paging message at a specific moment in a paging cycle. Correspondingly, the terminal device listens to, at the specific moment in the paging cycle, the paging message sent by the network device, and enters a sleep mode in other time periods, to save electric energy. After the terminal device determines that the terminal device is paged, the terminal device performs random access to establish a connection to the network device, and receives data sent by the network device.

For example, a discontinuous reception (Discontinuous Reception, DRX) mechanism is introduced to an LTE system to reduce power consumption of a terminal device. Specifically, in one DRX cycle, the terminal device monitors a PDCCH only at a paging moment of a paging radio frame. If the terminal device detects a paging radio network temporary identifier (Paging Radio Network Temporary Identity, P_RNTI) on the PDCCH, the terminal device receives and decodes data on a corresponding PDSCH, thereby obtaining a specific paging message. Otherwise, the terminal device only needs to go to sleep according to the DRX cycle. By using this mechanism, in one DRX cycle, the terminal device only needs to monitor the PDCCH at the paging moment, and then receives data on the PDSCH channel as needed, and may be in sleep in other time, to save power. It should be noted that the paging radio frame and the paging moment can be calculated by using a DRX parameter carried in system information. For a specific calculation method, refer to Chapter 7 in the 3rd generation partnership project (3rd Generation Partnership Project, 3GPP) TS36.304.

A paging process may be triggered by a core network. A specific process thereof may be: A mobility management entity (Mobility Management Entity, MME) sends a paging message to a network device in a tracking area code (Tracking Area Code, TAC), and then the network device pages a terminal device in a tracking area that is in a tracking area information identification (Tracking Area Identifications Information Element, TAIs IE) list. In addition, paging may be alternatively triggered by a network device, to notify of a system information update and instruct a terminal device to receive information sent by an earthquake and tsunami warning system (Earthquake and Tsunami Warning System, ETWS), a commercial mobile alert service (Commercial Mobile Alert Service, CMAS), and the like. It should be noted that one paging message may include a plurality of paging records (Paging Record), and each paging record is intended for a different terminal device and carries identity (Identity, ID) information of the terminal device. If a paging identifier (Paging ID) indicated in a paging message is an S-TMSI, it indicates that this paging is a normal service call. If a paging identifier is an IMSI it indicates that this paging is an exception call, used for error recovery on a network side. In this case, a terminal device needs to perform an attaching (Attach) procedure again.

If a paging message received by a terminal device carries a terminal device identifier (UE ID) list, the terminal device needs to match an identifier of the terminal device against a UE ID carried in the paging message, to determine whether the paging message pages the terminal device.

In a conventional LIE mobile communications system, a terminal device initially accessing the system mainly includes three important steps: (1) an initial synchronization and cell search procedure; (2) a network sending basic system information; and (3) a random access procedure. A detailed process is described below. In step (1), the terminal device may obtain downlink coarse time synchronization and coarse frequency synchronization based on a primary synchronization signal (Primary Synchronization Signal, PSS) and a secondary synchronization signal (Secondary Synchronization Signal, SSS), further obtain symbol synchronization and frame synchronization, and obtain information such as a cyclic prefix and a cell ID. In step (2), the system sends a basic system message (system information block (System Information Block, SIB) message), and by receiving the basic system message and reading the basic system information, the terminal device can obtain a network configuration message for uplink random access, and provide related information for the random access procedure in the third step. In step (3), the terminal device obtains resource configuration information for uplink random access based on the basic system information provided by the system, and performs the uplink random access procedure. According to a conclusion finally reached by the 3GPP, during an uplink random access procedure, a contention-based random access procedure still uses a method similar to a method of sending four messages in the conventional LTE system. To be specific, a terminal device sends a preamble sequence (Preamble); a network device feeds back a random access response (Random Access Response, RAR) message; the terminal device sends a message 3 (Message 3, Msg 3); and the network device returns a message 4 (Message 4, Msg 4) for contention resolution. In this way, the final uplink random access procedure is completed.

An existing contention-based random access manner is briefly described herein. First, a terminal device sends a random access preamble sequence (Random Access Preamble) to a network device, and notifies the network device of one random access request, so that the network device can estimate a transmission delay between the network device and the terminal device and calibrate an uplink timing advance (Timing Advance, TA) based on the transmission delay. After sending the preamble sequence, the terminal device monitors a PDCCH within a random access feedback time window, to receive an RAR message returned by the network device. Because a resource in which the preamble sequence is located may be used by a plurality of terminal devices, to distinguish between different terminal devices, next, each terminal device sends a Msg 3, where this information includes a unique identifier of the terminal device. In other words, unique identifiers of the terminal devices are different. In a final step, the network device indicates, by returning a unique identifier of a terminal device in a Msg 3 or unique identifiers of terminal devices in Msgs 3, a terminal device that succeeds in channel contention or terminal devices that succeed in channel contention.

A 5G mobile communications technology is an extension of a 4th generation (the 4 Generation, 4(1) mobile communications technology. Therefore, a 5G communications system is referred to as "a super 4G network", "a post long term evolution (Long Term Evolution, LIE) system", or new air interface (New Radio, NR).

A network device in the 5G communications system (for example, a next generation NodeB (Next Generation Node B, gNB), a transmission and reception point (Transmission and Reception Point, TRP), or a cell (cell)) may interact with a terminal device (for example, user equipment (User Equipment, UE)) by using a beamforming technology. The network device may usually form a plurality of downlink transmit beams, and send, on one or more transmit beams (that is, downlink transmit beams), a downlink signal to a terminal device within a coverage area of each transmit beam. The terminal device may receive the downlink signal by using a receive beam or an omnidirectional antenna, to obtain a relatively large array gain.

The network device cannot determine transmit beams under which a pageable terminal device within a downlink transmission coverage area of the network device is located. Therefore, to enable all pageable terminal devices to successfully access the paging message, the network device needs to send the paging message on each beam through sweeping. However, there may be no to-be-paged device under specific beams, consequently causing a waste of resources.

In existing standard discussion, it is proposed that the terminal device reports an optimal downlink transmit beam (Best Tx beam) to the network device, so that the network device can learn of transmit beams under which a to-be-paged terminal device is specifically located, and the network device may send the paging message only on these transmit beams, thereby reducing system overheads. However, after reporting the optimal downlink transmit beam, the terminal device needs to first receive the paging message and determine that the terminal device is paged, and then performs random access according to the method described above, resulting in a relatively large access delay.

In view of this, this application provides a random access method. A terminal device reports a beam by using a PRACH resource or a preamble sequence, receives a paging message in a subsequent process, determines that the terminal device is paged, and after determining that the terminal device is paged, may continue to complete a random access procedure. Compared with the prior art in which a terminal device initiates a random access procedure after determining that the terminal device is paged, this method can speed up the random access procedure of the paged UE, thereby reducing a transmission delay and signaling overheads. On the other hand, a network device sends the paging message only on the beam reported by the terminal device, instead of sending the paging message on each beam through sweeping, thereby reducing resource overheads used by the network device for sending the paging message.

The method in this application may be applied to a wireless communications system, for example, a new air interface (New Radio, NR) scenario, an LTE next-generation scenario, a wireless local area network (Wireless Local Area Networks, WLAN) scenario, Bluetooth communication, or a 3GPP-defined communications system. For ease of description, the new air interface scenario is used as an example for description in the embodiments of this application.

As shown in FIG. 1, an NR scenario may include a new air interface access network and a new air interface core network, for example, a new air interface new radio access technology core (New Radio new radio access technology core, NR newRAT-Core) network or a 5G core network. For ease of description, the new air interface core network is referred to as a core network, and the new air interface access network is referred to as an access network in this specification. Functional entities mainly are a network device 10 and a terminal device (for example, a terminal device 21 shown in FIG. 1) that connects to the network device in the new air interface access network. Optionally, the communications system may further include a relay device 30 and a terminal device (for example, a terminal device 22 shown in FIG. 1) that connects to the relay. The relay device 30 establishes a connection to the network device 10 by using a link 2. Therefore, for the network device 10, the relay device 30 may also be considered as a terminal device. The relay device 30 establishes a connection to the terminal device 22 by using a link 3. Therefore, for the terminal device 22, the relay device 30 may also be considered as a network device. Therefore, a person skilled in the art may understand that a network device described in this application may also include a relay device, and a terminal device described in this application may also include a relay device.

The network device may be specifically any one or a combination of several of a gNB, a new radio eNodeB (New radio eNB), a transmission point (Transmission and Reception Point, TRP), a macro base station, a micro base station, a high-frequency base station, an LTE macro or micro eNB, customer premise equipment (Customer Premise Equipment, CPE), an access point (Access Point, AP), WLAN GO, and the like. For example, the network device may be a gNB, and the gNB performs functions of a network device in this application. Alternatively, the network device is a combination of a gNB and a TRP. For example, the gNB performs a resource configuration function of a network device in this application, and the TRP performs transmission and reception functions of the network device in this application. This application is not limited thereto.

The terminal device may also be referred to as a terminal (Terminal), user equipment (user equipment, UE), a mobile station (mobile station, MS), a mobile terminal (mobile terminal, MT), or the like. The terminal device may be specifically a mobile phone, a tablet computer, a smart car, a sensing device, an internet of things (Internet of Things, IOT) device, CPE, a relay base station, and the like.

Figure 2:
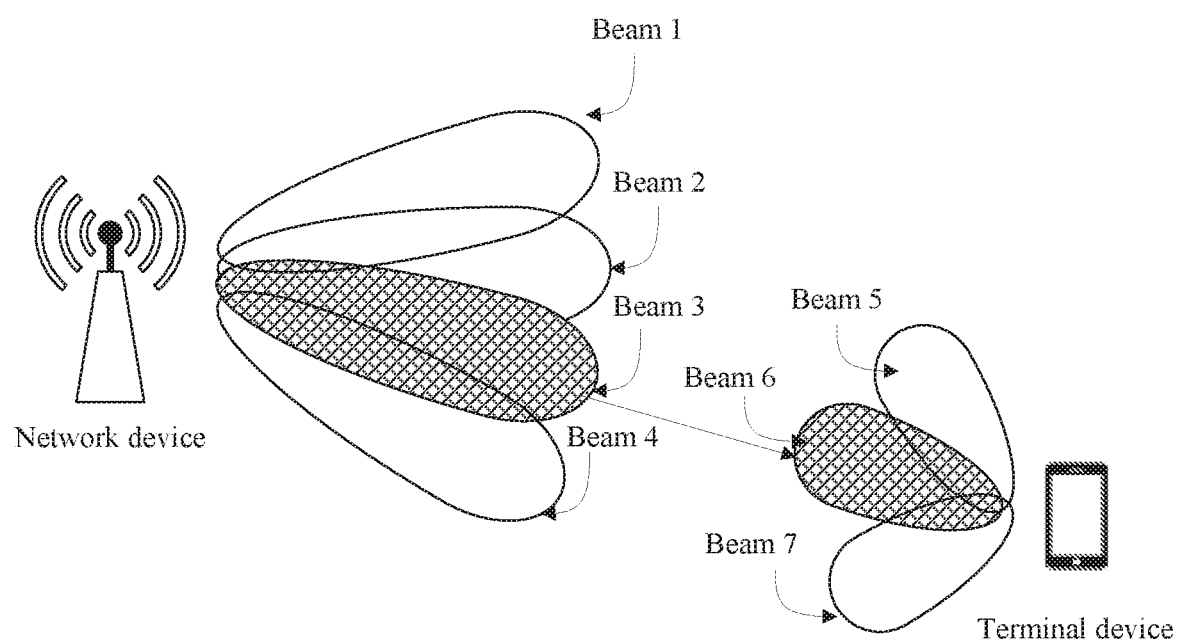
FIG. 2 is a schematic diagram of communicating, by a network device, with a terminal device by using a beamforming technology.

As shown in FIG. 2, in this application, a network device may form a plurality of transmit beams or receive beams by using a beamforming technology, for example, a digital beamforming (Digital Beamforming) or analog beamforming (Analog Beamforming) technology.

A beam may be understood as a spatial resource, and may be a transmit or receive precoding vector with energy transmission directivity. In addition, the transmit or receive precoding vector can be identified by index information. The energy transmission directivity may indicate that within a specific spatial location, a received signal that undergoes precoding processing performed by the precoding vector has a relatively satisfactory receive power, for example, meets a receive demodulation signal-to-noise ratio. Alternatively, the energy transmission directivity may indicate that a same signal that is sent from different spatial locations and received by using the precoding vector has different receive powers.

Optionally, a same communications device (for example, a terminal device or a network device) may have different precoding vectors, and different devices may also have different precoding vectors, that is, be corresponding to different beams. Based on a configuration or a capability of a communications device, one communications device may use one or more of a plurality of different precoding vectors at a same moment, that is, may form one or more beams simultaneously. Beam information may be identified by index information.

Further, the index information may be corresponding to a resource identifier (Identity, ID) configured to a terminal device. For example, the index information may be corresponding to a channel state information-reference signal (Channel Status information Reference Signal, CSI-RS) ID or a resource configured to a terminal device, or may be corresponding to an uplink sounding reference signal (Sounding Reference Signal, SRS) ID or a resource configured to a terminal device. Alternatively, the index information may be index information explicitly or implicitly carried by a beam-borne signal or a channel. For example, the index information may be indicated by a synchronization signal sent by a beam or indicated by a broadcast channel.

A beam pair (Beam Pair) may include a transmit beam at a transmit end and a receive beam at a receive end, or may include an uplink beam and a downlink beam. For example, a beam pair may include a transmit beam of a network device and a receive beam of a terminal device, or may include a transmit beam of a terminal device and a receive beam of a network device. The transmit beam may be alternatively understood as a send beam.

Angles covered by beams may be the same or different. Beams with different coverage angles may have an overlapping part. For example, a network device may send control information by using a beam with a relatively wide coverage angle, and send data information by using a beam with a relatively narrow coverage angle. A terminal device may receive, within a coverage area of one or more of the beams, a coverage area of a beam set, or a coverage area of a beam group, information sent by the network device.

The terminal device may also form a plurality of receive beams by using the beamforming technology, corresponding to downlink beams used by the network device. The terminal device determines whether to perform reception by using a specific receive beam or perform reception by using a plurality of receive beams. It should be noted that a beam in the embodiments of this application may represent a single or a plurality of beams.

Therefore, a downlink transmit beam of the network device and a corresponding receive beam of the terminal device, or an uplink transmit beam of the terminal device and a corresponding receive beam of the network device may be referred to as one beam pair. Transmission links formed by the beam pair are referred to as beam pair links (Beam Pair Link, BPL).

For example, when a network device in FIG. 2 uses a beam 3 as a downlink transmit beam, a terminal device may determine to use a beam 6 as a corresponding receive beam. The beam 3 and the beam 6 form a pair of BPLs. When a beam of the network device or the terminal device has a beam correspondence (Beam Correspondence) characteristic, a transmit beam or a receive beam may determine a corresponding receive beam or a corresponding transmit beam.

When there is no data exchange between the terminal device and the network device within a specific period of time, the terminal device may enter an RRC_IDLE state. When a new air interface core network needs to interact with a terminal device, the core network may trigger a paging process. Specifically, a functional entity that is responsible for mobility management and that is in the core network, for example, an MME, may send a paging message to a network device. An area covered by the network device may be a tracking area (Tracking Area). Alternatively, if the core network learns in advance that a current location of a to-be-paged terminal device is within coverage areas of some specific network devices, the MME may send the paging message only to these network devices. After receiving the paging message, the network devices perform paging in a cell in which the terminal device is located.

In this embodiment of this application, the network device needs to page a first terminal device. The first terminal device may be any terminal device of to-be-paged terminal devices. In the following, for ease of description, an example in which the network device in this embodiment of this application is a gNB and the first terminal device in this embodiment of this application is UE #1 is used for description.

It should be understood that the to-be-paged terminal device is a terminal device that needs to be paged. For example, if the MME determines that there is a call to a terminal device, the MME determines that the terminal device is a to-be-paged terminal device, and notifies the gNB of the to-be-paged terminal device.

It should be noted that some functions implemented by the gNB may be implemented by a TRP, for example, receiving/sending a system frame. In addition, the network device or the gNB in this embodiment of this application may be implemented by one or more functional entities in an actual implementation process, and may represent one or more network devices or gNBs. This application is not limited thereto.

A scenario to which this embodiment of this application is applied may be specifically: A terminal device is in an RRC_IDLE state and loses uplink synchronization further, the terminal device may be configured with DRX parameters, such as a DRX cycle, a paging occasion (Paging Occasion, PO), and a frequency offset; and within a DRX active time (Active time), the terminal device monitors a PDCCH within a PO within which the terminal device is. Specifically, the PO indicates a subframe or a time-frequency resource in which the UE #1 needs to detect a paging message. The time-frequency resource may be distributed over one or more subframes. It should be understood that the foregoing scenario is merely an example. An application scenario is not specifically limited in this application.

Figure 3:
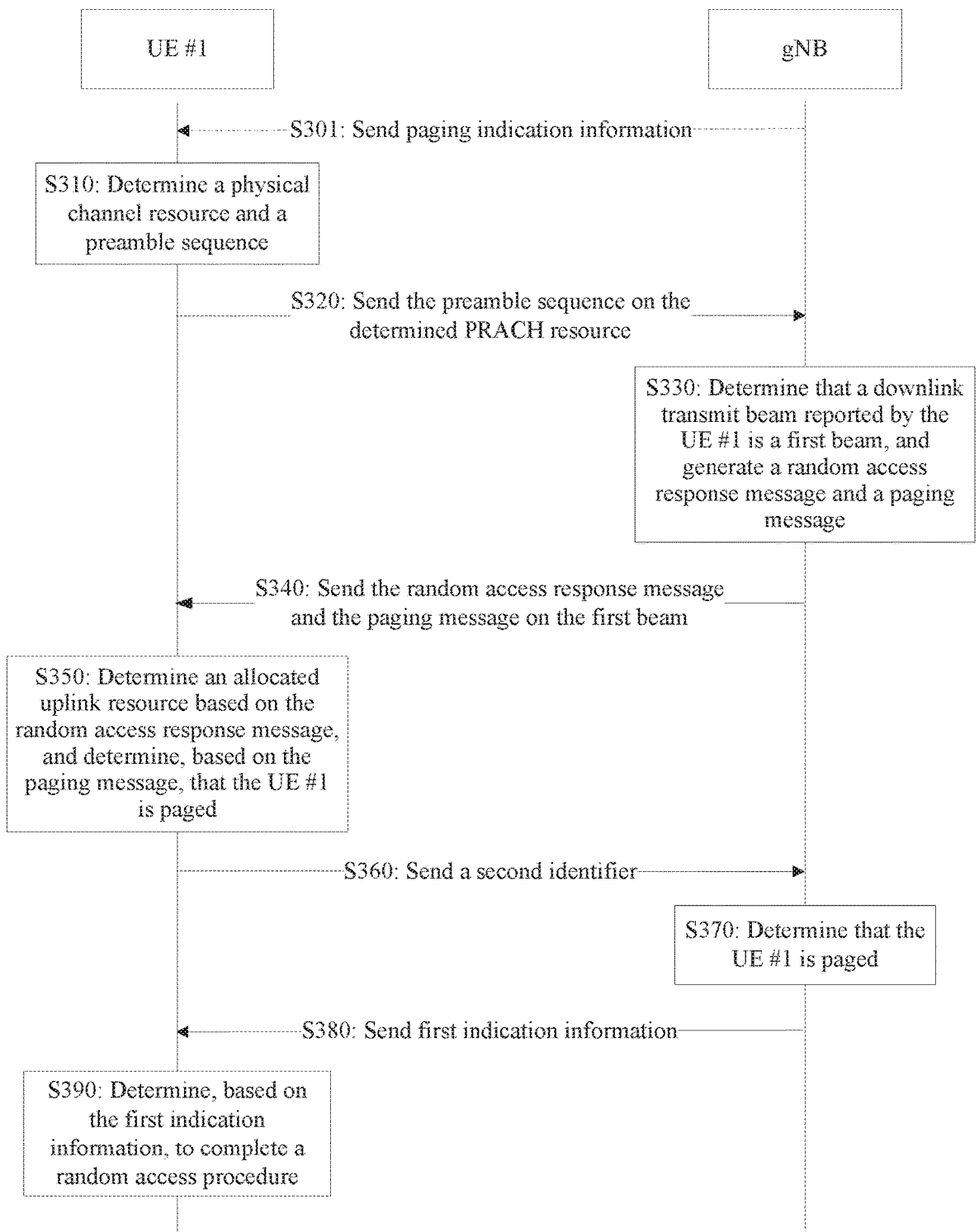
FIG. 3 is a schematic flowchart of a random access method according to this application.

FIG. 3 is a schematic flowchart of a random access method according to this application. The following describes the technical solutions of this application in detail with reference to FIG. 3.

S310: UE #1 determines a physical channel resource and a preamble sequence.

Specifically, the UE #1 determines a first beam from a plurality of transmit beams used by a gNB for performing downlink transmission with the UE #1, and determines a physical channel resource and/or a preamble sequence that are/is corresponding to the first beam. The physical channel resource is a resource used for sending a preamble sequence which may be any preamble sequence, or may be the preamble sequence corresponding to the first beam). Because the preamble sequence is sent on a physical random access channel (Physical Random Access Channel, PRACH), the physical channel resource is a PRACH resource.

For example, the UE #1 may receive reference signals sent on the plurality of transmit beams, such as a reference signal (for example, a synchronization signal SSS and/or a synchronization signal PSS) in a synchronization signal block (Synchronization Signal Block, SS Block), and a channel state information-reference signal (Channel State Information Reference Signal, CSI-RS) or a demodulation reference signal (Demodulation Reference Signal, DMRS), or receive paging indication information or physical broadcast channels (Physical Broadcast Channel, PBCH) sent on the plurality of transmit beams, and obtain related parameter information. The related parameter information may be at least one piece of information of received signal strength, a path loss, a signal-to-noise ratio (Signal to Noise Ratio, SNR), reference signal received power (Reference Signal Received Power, RSRP), reference signal received quality (Reference Signal Received Quality, RSRQ), a received signal strength indicator (Received Signal Strength Indicator, RSSI), and the like. Then, the UE #1 may select at least one beam based on the obtained at least one piece of information of received signal strength, path losses, SNRs, RSRP, RSRQ, RSSIs, and the like that are corresponding to the plurality of transmit beams, and determine the selected at least one beam as the first beam.

When performing beam selection, the UE #1 may determine a selected beam according to a specific determining criterion. For example, the UE #1 may select at least one beam with strongest received signal strength, or may select at least one beam with a largest SNR. For another example, the UE #1 may select at least one beam with best RSRQ, or the UE #1 may select at least one beam with highest RSRP, or the UE #1 may select at least one beam with a largest RSSI, or the UE #1 may select at least one beam with a smallest path loss. Selecting a beam with strongest received signal strength may be that a selected beam has a largest received signal strength value; selecting a beam with a largest SNR may be that a selected beam has a largest SNR value; selecting a beam with highest RSRP may be that a selected beam has a largest RSRP value; selecting a beam with best RSRQ may be that a selected beam has a largest RSRQ value; selecting a beam with a largest RSSI may be that a selected beam has a largest RSSI value; and selecting a beam with a smallest path loss may be that a selected beam has a smallest path loss value. It should be noted that selection of the first beam may be comprehensively determined with reference to the foregoing at least two selection methods. This application is not limited thereto.

After the UE #1 determines the first beam, the UE #1 determines a physical channel resource (that is, a PRACH resource) and/or a preamble sequence that are/is used for beam reporting. The PRACH resource and/or the preamble sequence resource are/is associated with the first beam. In other words, the PRACH resource and/or the preamble sequence resource may be used for indicating, to the gNB, that a beam reported by the UE #1 through beam reporting is the first beam.

For example, the PRACH resource may be determined from uplink transmission resources used for random access, or the PRACH resource may be determined from uplink transmission resources dedicatedly used by a to-be-paged terminal device for beam reporting. In addition, the preamble sequence may be determined from a preamble sequence set used for random access, or the preamble sequence may be determined from a preamble sequence set dedicatedly used by a to-be-paged terminal device for beam reporting. It should be noted that in some cases, the uplink transmission resources dedicatedly used by a to-be-paged terminal device for beam reporting and/or the preamble sequence set dedicatedly used by a to-be-paged terminal device for beam reporting may be alternatively used by another terminal device for beam reporting.

In a first possible implementation, when the PRACH resource is determined from the uplink transmission resources used for random access, the PRACH resource may be used for indicating, to the gNB, that a beam determined by the UE #1 is the first beam. An indication manner may be agreed in advance or indicated by the gNB to the UE #1. For example, the gNB performs indication in system information, for example, performs indication by using a master information block (Master Information Block, MIB) or a SIB, or performs indication by adding PRACH configuration information to a radio resource control (Radio Resource Control, RRC) message, a media access control unit (Media Access Control Element, MAC CE), downlink control information (Downlink Control Information, DCI), or the like. Specifically, the PRACH configuration information may include a correspondence between an available PRACH resource and each downlink transmit beam of the gNB, for example, include information about a correspondence between a PRACH resource index and identification information of each downlink transmit beam. The PRACH resource index indicates a time domain location and/or a frequency domain location of each PRACH resource. The PRACH resource index may be one or more of a PRACH mask index/ra-PRACH-MaskIndex, a PRACH configuration index/prach-ConfigurationIndex, and a PRACH frequency offset/prach-FrequencyOffset. Identification information of a beam may be specifically one or more of an ID of the beam, an ID generated based on the ID of the beam, a name of the beam, an index of the beam, an index generated based on the index of the beam, a derivative value of the ID of the beam, a derivative value of the name of the beam, a derivative value of the index of the beam, a hash value of the ID of the beam, a hash value of the name of the beam, a hash value of the index of the beam, a truncated value of the ID of the beam, a truncated value of the name of the beam, a truncated value of the index of the beam, a hash value of the ID of the beam combined with plaintext information, a hash value of the name of the beam combined with plaintext information, a hash value of the index of the beam combined with plaintext information, a bitmap of the ID of the beam, a bitmap of the name of the beam, a bitmap of the index of the beam, a bitmap of the beam, and the like. Therefore, when the UE #1 determines that a beam that needs to be reported is the first beam, the UE #1 determines, with reference to the correspondence information, a PRACH resource corresponding to the first beam, and transmits the preamble sequence on the PRACH resource.

Correspondingly, the UE #1 determines that the preamble sequence may be randomly determined from the preamble sequence set dedicatedly used by a to-be-paged terminal device for beam reporting. Therefore, after receiving the preamble sequence, the gNB can determine that the UE #1 is one of to-be-paged terminal devices. The preamble sequence set may be agreed in advance or indicated by the gNB to the UE #1. For example, the gNB performs indication in system information, for example, performs indication by using a MIB or a SIB, or performs indication by adding preamble sequence configuration information to an RRC message, a MAC CE, DCI, or the like. The preamble sequence configuration information may be carried in a logical index, for example, _RACH_ROOT_SEQUENCE_ or rootSequenceIndexHighSpeed. The preamble sequence configuration information may indicate available preamble sequences. Correspondingly, the UE #1 may randomly select one from the available preamble sequences. Alternatively, the preamble sequence configuration information may indicate information, for example, a root sequence, used for generating a preamble sequence. The root sequence may be used for the UE #1 to generate a final preamble sequence. Specifically, the root sequence may be a Zadoff-Chu sequence, a Root Zadoff-Chu sequence, a plurality of cyclic shift root Zadoff-Chu sequences in ascending or descending order, or any other available orthogonal sequence. Correspondingly, the UE #1 may randomly select one or more from the root sequences, and generate a preamble sequence based on the root sequence. Alternatively, the preamble sequence configuration information may be label information that is corresponding to specific preamble sequences or information used for generating a preamble sequence. The UE #1 may randomly select one from the preamble sequences or the information used for generating a preamble sequence, where the preamble sequences and the information are corresponding to the label information. A person skilled in the art may understand that for a specific process of determining a preamble sequence by the UE #1, reference may be made to a method described in 3GPP TS 36.211 and 3GPP TS 36.321, and another method may be alternatively used. A method of determining a preamble sequence by the UE #1 is not specifically limited in this application.

According to the method, after receiving the preamble sequence on the PRACH resource, the gNB can determine that a beam reported through beam reporting by the UE #1, which sends the preamble sequence, is the first beam.

In a second possible implementation, when the PRACH resource is determined from the uplink transmission resources dedicatedly used by a to-be-paged terminal device for beam reporting, the PRACH resource may be used for indicating, to the gNB, that a beam reported by the UE #1 through beam reporting is a beam 1. An indication manner may be agreed in advance or indicated by the gNB to the UE #1. For the indication manner and a determining manner of the UE #1, refer to the foregoing first possible implementation, and details are not described herein again.

Further, the PRAM resource may be further used for indicating, to the gNB, that the UE #1 is one of to-be-paged terminal devices.

Correspondingly, the UE #1 determines that the preamble sequence may be randomly determined from the preamble sequence set dedicatedly used for random access or randomly determined from the preamble sequence set dedicatedly used by a to-be-paged terminal device for beam reporting. The preamble sequence set may be agreed in advance or indicated by the gNB to the UE #1. For an indication manner and a determining manner of the UE #1, refer to the foregoing first possible implementation, and details are not described herein again.

According to the method, after receiving the preamble sequence on the PRAM resource, the gNB can determine that a beam reported through beam reporting by the UE #1, which sends the preamble sequence, is the first beam.

In a third possible implementation, when the preamble sequence resource is determined from the preamble sequence set dedicatedly used by a to-be-paged terminal device for beam reporting, the preamble sequence may be used for indicating, to the gNB, that a beam reported by the terminal device through beam reporting is the first beam. An indication manner may be agreed in advance or indicated by the gNB to the UE #1. For example, the gNB performs indication in system information, for example, performs indication by using a MIB or a SIB, or performs indication by adding preamble sequence configuration information to an RRC message, a MAC CE, DCI, or the like. The preamble sequence configuration information may include a correspondence between an available preamble sequence and each downlink transmit beam of the gNB, for example, include information about a correspondence between a preamble sequence index and identification information of each downlink transmit beam. The preamble sequence index indicates an available preamble sequence. The preamble sequence index may be a logical index, for example, _RACH_ROOT_SEQUENCE_ or rootSequenceIndexHighSpeed. The preamble sequence index may indicate an available preamble sequence, or the preamble sequence index may indicate information, for example, a root sequence, used for generating a preamble sequence. The root sequence may be used for the UE #1 to generate a final preamble sequence. Specifically, the root sequence may be a Zadoff-Chu sequence, a Root Zadoff-Chu sequence, a plurality of cyclic shift root Zadoff-Chu sequences in ascending or descending order, or any other available orthogonal sequence. The UE #1 may generate a preamble sequence based on one or more of the root sequences. Alternatively, the preamble sequence index may be label information that is corresponding to specific preamble sequences or information used for generating a preamble sequence. Identification information of a beam may be specifically one or more of an ID of the beam, an ID generated based on the ID of the beam, a name of the beam, an index of the beam, an index generated based on the index of the beam, a derivative value of the ID of the beam, a derivative value of the name of the beam, a derivative value of the index of the beam, a hash value of the ID of the beam, a hash value of the name of the beam, a hash value of the index of the beam, a truncated value of the ID of the beam, a truncated value of the name of the beam, a truncated value of the index of the beam, a hash value of the ID of the beam combined with plaintext information, a hash value of the name of the beam combined with plaintext information, a hash value of the index of the beam combined with plaintext information, a bitmap of the ID of the beam, a bitmap of the name of the beam, a bitmap of the index of the beam, a bitmap of the beam, and the like. Alternatively, the preamble sequence index may indicate one or more of a polynomial, a cyclic shift indication, sequence length indication information, an original sequence, duration information, format information, and group information that are used for generating a preamble sequence (not described herein temporarily and described in detail in the following).

Therefore, when a beam to-be-reported by the UE #1 through beam reporting is the first beam, the UE #1 determines, with reference to the correspondence information, a preamble sequence corresponding to the first beam, and transmits the preamble sequence on a determined PRACH resource.

Further, the preamble sequence is further used for indicating, to the gNB, that the UE #1 is one of to-be-paged terminal devices.

Correspondingly, the UE #1 determines that the PRACH resource may be determined from the uplink transmission resources used for random access, for example, determined from a PRACH resource set that may be used for random access and that is indicated by the gNB. An indication manner may be that the gNB performs indication in system information, for example, performs indication by using a MIB or a SIB, or performs indication by adding PRACH configuration information to an RRC message, a MAC CE, DCI, or the like. The PRACH configuration information indicates a time domain location and/or a frequency domain location of each available PRACH resource. The PRACH configuration information may be one or more of a PRACH mask index/ra-PRACH-MaskIndex, a PRACH configuration index/prach-ConfigurationIndex, and a PRACH frequency offset/prach-FrequencyOffset. The UE #1 may obtain, by using the PRACH configuration information, a next subframe including a PRACH resource, and randomly select one PRACH resource in an available PRACH resource set for transmitting the preamble sequence determined by the UE #1. A person skilled in the art may understand that for a method of determining a PRACH resource by the UE #1, reference may be made to a related method described in 3GPP TS 36.321, and another method may be alternatively used. The method of determining a PRACH resource by the UE #1 is not specifically limited in this application.

According to the method, after receiving the preamble sequence on the PRACH resource, the gNB can determine that a beam reported through beam reporting by the UE #1, which sends the preamble sequence, is the first beam.

In a fourth possible implementation, when the preamble sequence is determined from the preamble sequence set used for random access, the preamble sequence resource may be used for indicating, to the gNB, that a beam reported by the terminal device through beam reporting is the first beam. Specifically, the preamble sequence set may be agreed in advance or indicated by the gNB. An indication manner may be agreed in advance or indicated by the gNB to the UE #1. For a manner of performing indication by the gNB to the UE #1 and a determining manner of the UE #1, refer to the foregoing third possible implementation, and details are not described herein again.

Correspondingly, the UE #1 determines that the PRACH resource may be determined from the uplink transmission resources dedicatedly used by a to-be-paged terminal device for beam reporting, for example, determined from a PRACH resource set that may be dedicatedly used by a to-be-paged terminal device for beam reporting and that is indicated by the gNB. For an indication manner and a determining manner of the UE #1, refer to the foregoing third possible implementation. The PRACH resource is used for indicating, to the gNB, that the UE #1, which sends the preamble sequence, is one of to-be-paged terminal devices.

According to the method, after receiving the preamble sequence on the PRAM resource, the gNB can determine that a beam reported through beam reporting by the UE #1, which sends the preamble sequence, is the first beam.

Optionally, before S310, the method may further include:

S301: The gNB sends paging indication information, and correspondingly, the UE #1 receives the paging indication information.

The paging indication information is used to instruct a pageable terminal device within a beam coverage area to perform beam reporting. After receiving the paging indication information, the UE #1 may perform step S310.

The pageable terminal device may be some or all of terminal devices of one or more of the following types of terminal devices: a terminal device in an idle state, a terminal device in a connected state, a terminal device in an idle state and within a DRX active time, a terminal device in a connected state and within a DRX active time, a terminal device in an idle state and within a PO monitoring time period, a terminal device in a connected state and within a PO monitoring time period, and the like.

Further, the paging indication information may further include group information.

The group information is used to indicate a group in which a to-be-paged terminal device is. The group information may be specifically indicated by a group identifier, or may be indicated by a bitmap (Bitmap). The group is indicated by setting one or more bits corresponding to a group identifier of the group to 1, 0, or a predetermined value.

Before sending the paging indication information, the gNB may obtain group information of the to-be-paged terminal device. For example, the gNB may obtain the group information of the to-be-paged terminal device in the following two possible implementations.

In a possible implementation, the gNB may calculate the group information of the to-be-paged terminal device in an agreed manner.

For example, the gNB performs calculation on core network identifiers (for example, S-TMSIs or IMSIs) of to-be-paged terminal devices by using a specific algorithm, and classifies calculation results to obtain group information. The specific algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto. For example, after performing SHA-256 hashing on S-TMSIs of terminal devices, the gNB may convert results into decimal numbers, then perform a modulo 16 operation on the decimal numbers to obtain calculation results, and divide terminal devices with a same calculation result value into a same group. For example, a group with a calculation result of 1 may be recorded as a first group, a group with a calculation result of 2 may be recorded as a second group, . . . , and so on. Therefore, if the group information in the paging indication information is indicated by a bitmap, and to-be-paged terminal devices exist only in the first group and the second group, a 16-bit bitmap may be set to 0000 0000 0000 0011.

In another possible implementation, a core network may perform grouping and send group information to the gNB.

In addition, the paging indication information may further include identification information of the UE #1. The identification information of the UE #1 may be indicated in a manner in which the paging indication information directly carries UE #1, or may be indicated by a bitmap. For example, the identification information of the UE #1 may be any one or more of an S-TMSI, an IMSI, a C-RNTI, an index value of the UE #1, a MAC address, and the like, or may be a result obtained after calculation is performed on any one or more of an S-TMSI, an IMSI, a C-RNTI, an index value of the UE #1, a MAC address, and the like by using one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

In this application, the paging indication information may be sent on a plurality of transmit beams through sweeping.

Figure 4:
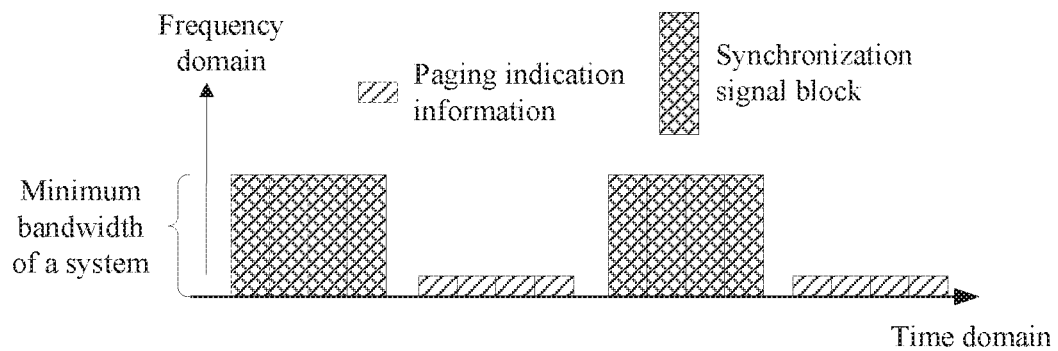
FIG. 4 is a schematic diagram of a resource occupied by paging indication information.

For example, as shown in FIG. 4, the paging indication information may be sent within a frequency domain range within which a minimum bandwidth of a system is.

Figure 5:
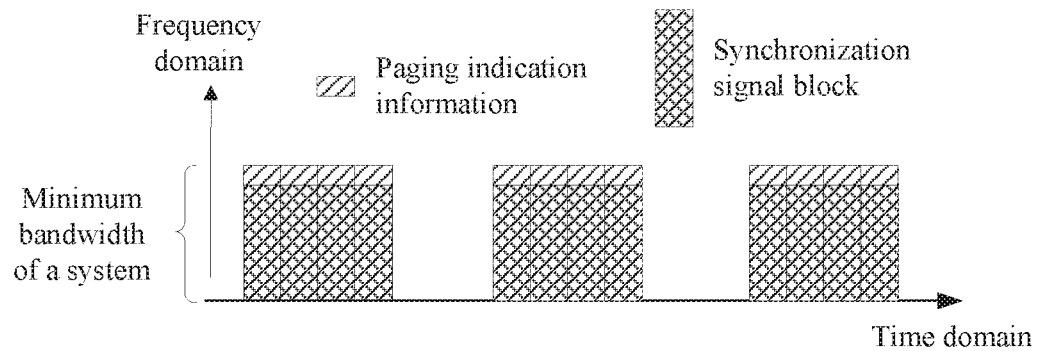
FIG. 5 is another schematic diagram of a resource occupied by paging indication information.

Alternatively, frequency division multiplexing may be implemented for the paging indication information and an SS burst. For example, as shown in FIG. 5, paging indication information sent on a transmit beam and a synchronization signal block SS block on the transmit beam may be located in different frequency domains of a same slot. The SS burst is a set of SS blocks sent by the gNB in all beam directions of one round.

For another example, frequency division multiplexing may be implemented for the paging indication information and a PBCH. For example, paging indication information sent on a transmit beam and a PBCH on the transmit beam may be located in different frequency domains of a same slot. Alternatively, the paging indication information may be carried in a PBCH.

In addition, the paging indication information may be sent in all directions or sent on a relatively wide beam. Further, to improve a success rate of receiving the paging indication information by a terminal device at a cell edge, the paging indication information may be repeatedly sent for a plurality of times.

S320: The UE #1 sends the preamble sequence on the determined PRACH resource.

A person skilled in the art may understand that for a method of sending a preamble sequence by the UE #1, reference may be made to a related method described in 3GPPTS36.321. In addition, another method of sending a preamble sequence may be alternatively used. A specific sending manner of the preamble sequence is not limited in this embodiment of this application.

S330: The gNB determines that a downlink transmit beam reported by the UE #1 is the first beam, and generates a random access response message and a paging message.

After receiving the preamble sequence sent by the UE #1, the gNB can determine, based on the PRACH resource and/or the preamble sequence that are/is used by the UE #1, that the gNB can perform downlink transmission with the UE #1 by using the first beam. Specifically, after the gNB determines the PRACH resource used by the UE #1, the gNB can determine, according to the correspondence between a PRACH resource and each downlink transmit beam of the gNB, that a transmit beam that can be used by the gNB to perform downlink transmission with the UE #1 is the first beam. Alternatively, after the gNB determines the preamble sequence sent by the UE #1, the gNB can determine, according to the correspondence between a preamble sequence and each downlink transmit beam of the gNB, that a transmit beam that can be used by the gNB to perform downlink transmission with the UE #1 is the first beam.

In this application, the paging message generated by the gNB may include first identification information of one or more to-be-paged terminal devices. It should be understood that the one or more to-be-paged terminal devices include the UE #1.

For example, the first identification information may be any one or more of an S-TMSI, an IMSI, a C-RNTI, or another NAS identifier.

For example, the first identification information may alternatively be identification information generated based on one or more of an S-TMSI, an IMSI, a C-RNTI, or another NAS identifier and according to a specific algorithm. The specific algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto. For example, the first identification information may be identification information obtained after an S-TMSI is truncated to obtain least significant 16 bits.

Optionally, the paging message may be carried in manners such as an RRC message, a MAC CE, or DCI. It should be understood that the paging message may be alternatively carried in another message or signaling. A message or signaling carrying the paging message is not specifically limited in this application.

When the paging message is carried in an RRC message, a person skilled in the art may understand that for a specific carrying method, reference may be made to a related method described in 3GPP 36.331. For example, an RRC message may include one or more paging records (Paging Record), and each paging record includes first identification information of one to-be-paged terminal device. It should be understood that the RRC message may alternatively carry the paging message by using another method. A specific manner of carrying the paging message by the RRC message is not limited in this embodiment of this application.

In this application, that the gNB generates the random access response message may be specifically: The gNB generates a corresponding random access response message based on one or more preamble sequences received on the PRACH resource. The random access response message includes uplink resource indication information and a preamble identifier. The uplink resource indication information is used to indicate an uplink resource allocated by the gNB, and the preamble identifier is corresponding to a corresponding preamble sequence.

Optionally, the random access response message may be carried in manners such as an RRC message, a MAC CE, or DCI. It should be understood that the random access response message may be alternatively carried in another message or signaling. A message or signaling carrying the random access response message is not specifically limited in this application.

Further, when both the paging message and the random access response message are carried in a MAC CE, the paging message and the random access response message may be carried in different MAC PDUs (that is, a manner 1); alternatively, the paging message and the random access response message may be carried in a same MAC PDU (that is, a manner 2). The following describes the manner 1 and the manner 2 in detail.

Manner 1

An RAR may be carried in a MAC PDU. For example, FIG. 6 is a schematic diagram of a format of a MAC PDU carrying an RAR.

Figure 6:
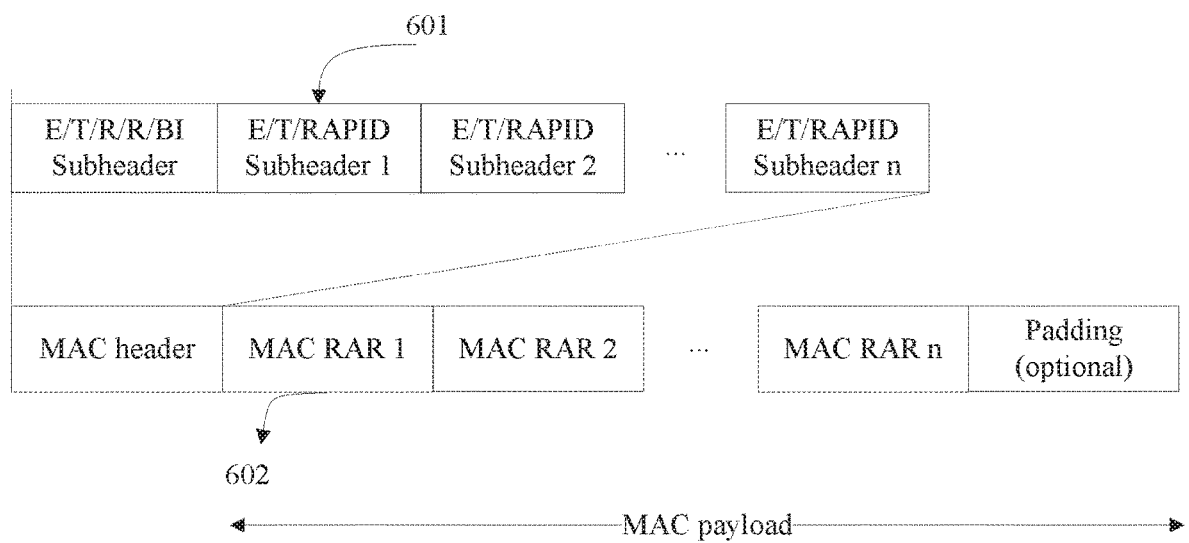
FIG. 6 is a schematic diagram of a format of a MAC PDU carrying a random access response RAR message.

As shown in FIG. 6, the MAC PDU includes three parts: a MAC header (Header), a MAC payload (Payload), and an optional padding (padding) part. The RAR may include a MAC subheader (Subheader) 601 and a corresponding MAC RAR 602 in the MAC payload. The random access response message may include one or more MAC PDUs, that is, include a plurality of RARs. The plurality of RARs may include an RAR that is intended for the to-be-paged terminal device, or may include an RAR that is intended for a terminal device that performs conventional random access. RARs corresponding to a plurality of preamble sequences received on a same PRACH resource may be carried in a same MAC PDU.

In FIG. 6, the MAC header includes one or more MAC subheaders 601, but only one subheader can include a backoff indicator (Backoff Indicator, BI), and this subheader can be placed only in the first subheader position. Each of other subheaders not including the BI is corresponding to one MAC RAR. A MAC subheader including a BI parameter includes E/T/R/R/BI, whereas another subheader includes E/T/RAPID. A meaning of each field in a MAC subheader is as follows:

E: an extension field, an extension field, indicating whether there is another MAC subheader subsequently. For example, 1 indicates that there is another MAC subheader, and 0 indicates that there is no more MAC subheader subsequently.

T: a type field, a type field, indicating whether the MAC subheader is followed by the BI or a random access preamble identifier (Random Access Preamble Identifier, RAPID). For example, 1 indicates that the current MAC subheader is followed by a RAPID, and 0 indicates that the current MAC subheader is followed by the BI. It should be understood that the RAPID is the preamble identifier in this specification.

R: a reserved bit, a reserved bit, set to 0.

BI: a backoff indicator, occupying four bits and ranging from 0 to 15. A leftmost bit is the most significant bit, and a rightmost bit is the least significant bit (the same below).

RAPID: a random access preamble identifier, occupying six bits and ranging from 0 to 63.

Any MAC RAR of a MAC RAR 1, a MAC RAR 2, . . . , and a MAC RAR n shown in FIG. 6 may include one or more of an R field, a timing advance command (Timing Advance Command, TAC) field, an uplink grant (UL Grant) field, and a temporary cell radio network temporary identifier (Temporary Cell Radio Network Temporary Identity, Temporary C-RNTI) field.

Figure 7:
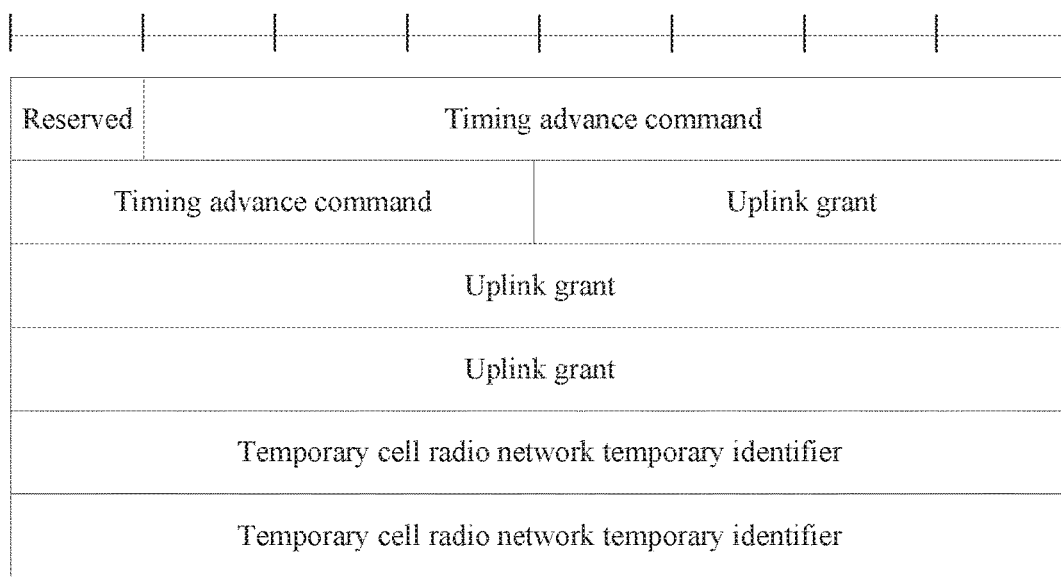
FIG. 7 is a schematic diagram of a format of a MAC RAR.

A possible format of a MAC RAR is shown in FIG. 7. A meaning of each field in the MAC RAR is as follows:

R: a reserved bit, a reserved bit, set to 0.

Timing Advance Command: indicates an index value used to control a time adjustment amount.

UL Grant: an uplink grant (or referred to as uplink resource indication information), indicating a resource used for an uplink. Temporary C-RNTI: indicates a temporary identifier used in a random access procedure.

It can be learned from the foregoing description that the preamble identifier in the random access response message can be learned of according to the RAPID field in FIG. 6, and the uplink resource can be learned of according to the UL grant field in FIG. 7.

It should be understood that a row in FIG. 7 represents a byte, and a bit occupied by each field and a relative position of each field shown in FIG. 7 are merely examples. This application is not limited thereto.

A paging message may also be carried in a MAC PDU. For example, FIG. 8 is a schematic diagram of a format of a MAC PDU carrying a paging message.

Figure 8:
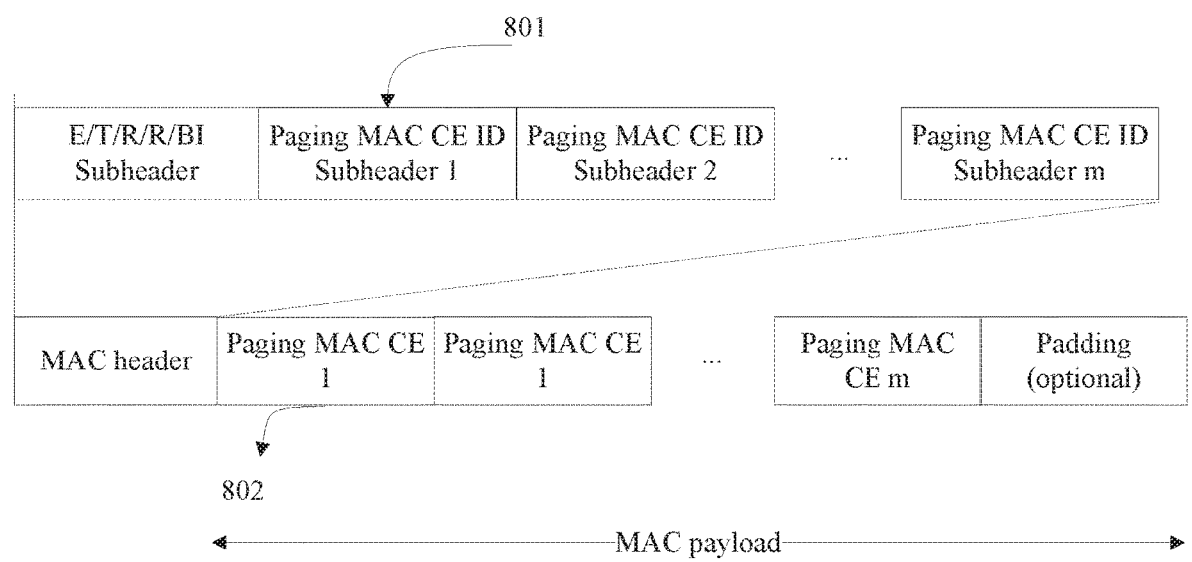
FIG. 8 is a schematic diagram of a format of a MAC PDU carrying a paging message.

As shown in FIG. 8, the MAC PDU shown in the figure includes three parts: a MAC header (Header), a MAC payload (Payload), and an optional padding (padding) part. The MAC header part may include one or more MAC subheaders 801. A MAC subheader includes a paging (Paging) MAC CE ID. The paging MAC CE ID is used to identify first identification information of a to-be-paged terminal device. The MAC payload part may include one or more paging MAC CEs 802. Each paging MAC CE may carry first identification information of one or more to-be-paged terminal devices.

It should be noted that when the MAC PDU shown in FIG. 8 includes only one paging MAC CE, the MAC subheader may be a MAC header and include a paging MAC CE ID.

It should be understood that a MAC subheader with a BI parameter includes E/T/R/R/BI. For details, refer to the description of the MAC PDU shown in FIG. 8. For brevity, details are not described herein again.

For example, the paging MAC CE ID may be identification information generated based on the first identification information and according to a specific algorithm, or the paging MAC CE ID may be a preamble sequence index or identification information generated based on a preamble sequence index and according to a specific algorithm. The preamble sequence index is an index value corresponding to a preamble sequence that is sent by a to-be-paged terminal device and that is received by the gNB. Alternatively, the paging MAC CE ID may be a PRACH resource index or identification information generated based on a PRACH resource index and according to a specific algorithm. The PRACH resource index is an index value corresponding to a PRACH resource that is used when a to-be-paged terminal device sends a preamble sequence and that is received by the gNB. Alternatively, the paging MAC CE ID may be a paging dedicated identifier (that is, an example of a seventh identifier), for example, a P-RNTI, or identification information (that is, another example of a seventh identifier) generated based on a paging dedicated identifier and according to a specific algorithm. Alternatively, the paging MAC CE ID may be identification information generated based on at least two of the foregoing examples and according to a specific algorithm. The specific algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

For example, in some possible implementations, the paging MAC CE ID is the first 16 bits of SHA-1 (first identification information) or the paging MAC CE ID is a value obtained after a bitwise OR operation is performed on 101 and the first five bits of a preamble sequence index; or the paging MAC CE ID is a value obtained after a bitwise OR operation is performed on 1011 and the first four bits of a PRACH resource index; or the paging MAC CE ID is the first eight bits of SHA-256 (P-RNTI).

Manner 2

The random access response message and the paging message are carried in a same MAC PDU. For example, FIG. 9 is a schematic diagram of a format of a MAC PDU carrying a random access response message and a paging message.

Figure 9:
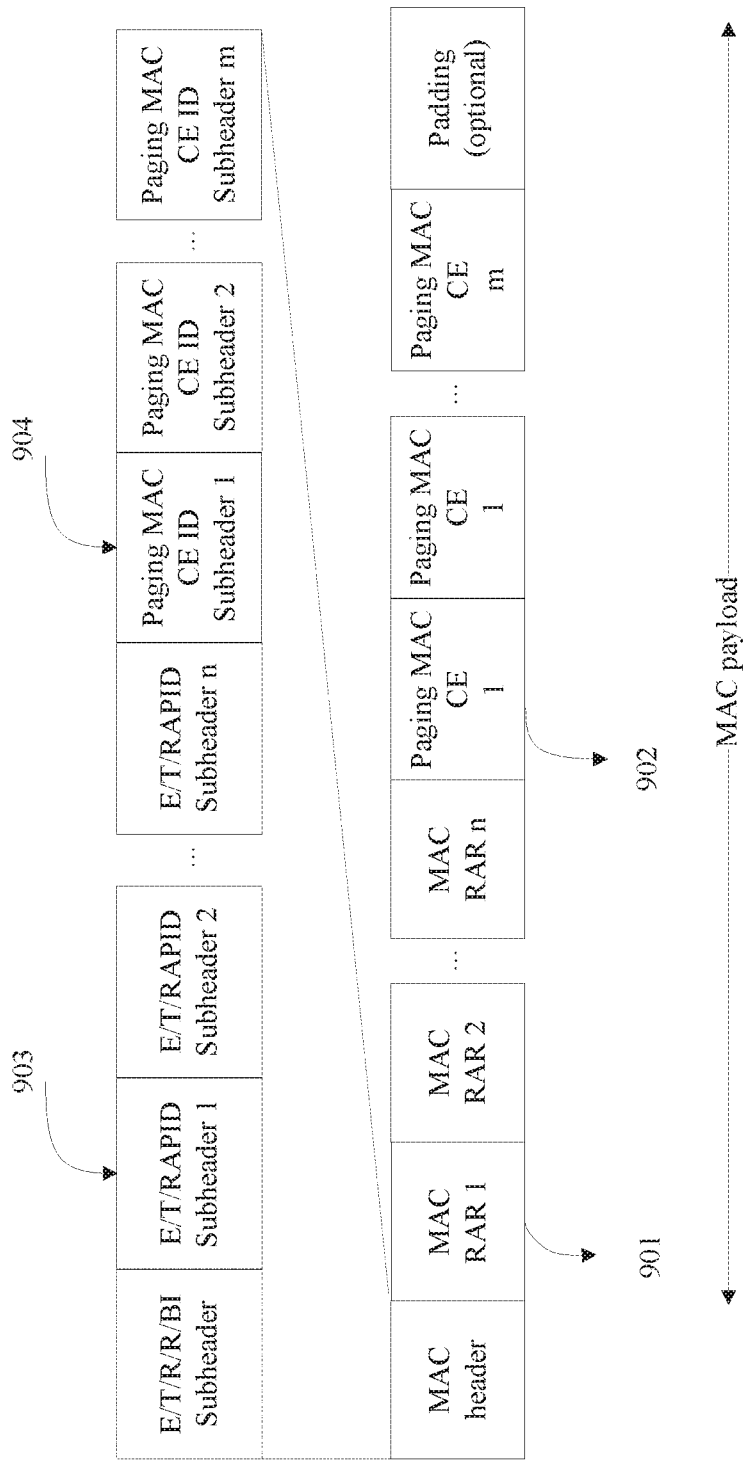
FIG. 9 is a schematic diagram of a format of a MAC PDU carrying a random access response message and a paging message.

As shown in FIG. 9, the MAC PDU includes three parts: a MAC header (Header) field, a MAC payload (Payload) field, and an optional padding (padding) field. The MAC PDU may include one or more RARs 901 and one or more paging MAC CEs 902. Correspondingly, an RAR may include a MAC subheader 903 and a MAC RAR 901, and a paging MAC CE may include a MAC subheader 904 and a paging MAC CE 902 in the MAC payload part. For specific content of the MAC RAR 901, refer to the MAC RAR 602 in the manner 1; for specific content of the MAC subheader 903, refer to the MAC subheader 601 in the manner 1; for specific content of the paging MAC CE 902, refer to the paging MAC CE 802 in the manner 1; and for specific content of the MAC subheader 901, refer to the MAC subheader 801 in the manner 1. Details are not described herein again.

S340: The gNB sends the random access response message and the paging message on the first beam. Correspondingly, the UE receives the random access response message and the paging message.

The random access response message and the paging message may be carried in a PDSCH. Correspondingly, downlink resource allocation (Downlink Assignment) information is carried in a PDCCH.

Figure 10:
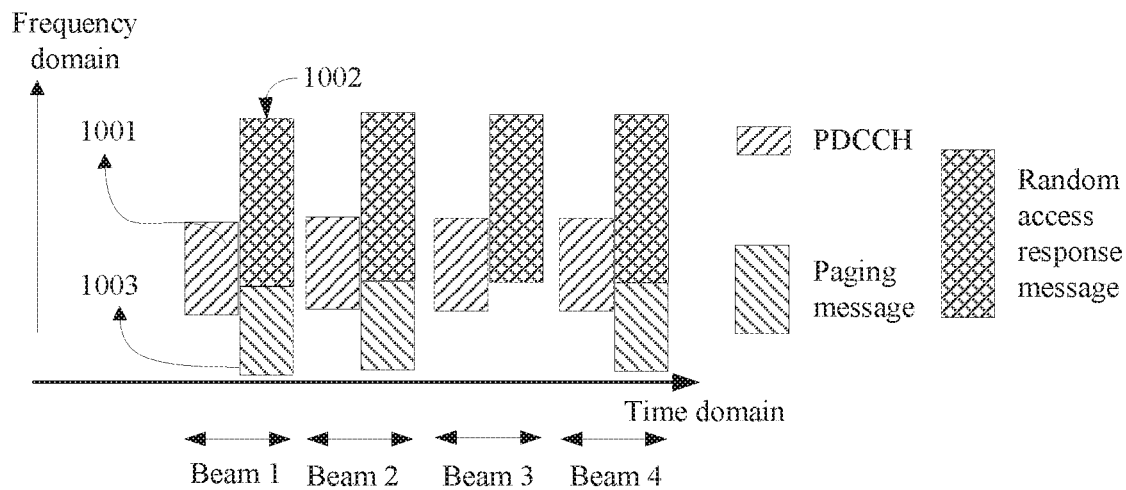
FIG. 10 is a schematic diagram of one type of resource allocation.

For example, FIG. 10 is a schematic diagram of one type of resource allocation. The schematic diagram of the resource allocation shown in FIG. 10 may be corresponding to the manner 1 in step S330, In other words, the random access response message and the paging message are carried in different MAC PDUs. As shown in FIG. 10, a PDSCH resource (for example, 1002 in FIG. 10) in which the random access response message is located and a PDSCH resource (for example, 1003 in FIG. 10) in which the paging message is located may be located in different frequency domain resources within a same time period. In this case, the UE #1 can obtain the random access response message and the paging message within the same time period when performing reception. This helps the UE #1 quickly perform next processing.

For example, the time period may be at least one of a start time, an end time, duration, a symbol, a slot (slot), a subframe, a mini (mini) subframe, a mini slot, or an orthogonal frequency division multiplexing (Orthogonal Frequency Division Multiplexing, OFDM) symbol. The same time period may mean that a time period occupied by 1002 and a time period occupied by 1003 are totally the same, or may mean that a time period occupied by 1002 and a time period occupied by 1003 are partially the same. In other words, a part of the time period occupied by 1002 is the same as that occupied by 1003, and a part of the time period occupied by 1002 is different from that occupied by 1003. The frequency domain or the frequency domain resource may be at least one of a frequency band, a frequency band, a subband, a physical resource block (Physical Resource Block, PRB), a resource element (Resource Element, RE), a frequency domain position, and a subcarrier.

In addition, the PDSCH resource in which the random access response message is located and the PDSCH resource in which the paging message is located may be alternatively located in a same frequency domain resource within different time periods. In this case, the UE #1 can obtain the random access response message and the paging message within a same bandwidth. This has a relatively low requirement for a bandwidth capability of the UE #1.

It should be noted that the PDSCH resource in which the random access response message is located and the PDSCH resource in which the paging message is located may be alternatively located in different frequency domain resources within different time periods. This is not limited in this application.

1001 shown in FIG. 10 is a PDCCH resource. A first part of the resource of 1001 is used for transmitting downlink resource allocation information corresponding to 1002, and a second part of the resource is used for transmitting downlink resource allocation information corresponding to 1003. The first part of the resource and the second part of the resource may be different, or the first part of the resource and the second part of the resource may be the same. For example, both the downlink resource allocation information corresponding to 1002 and the downlink resource allocation information corresponding to 1003 may be carried in a code division multiplexing manner, thereby sharing a PDCCH resource and saving system resources.

In addition, the random access response message and the paging message may be alternatively located within a same PDSCH resource. In other words, a PDSCH resource indicated by downlink resource allocation information in 1001 is used for indicating, to the UE #1, that both the random access response message and the paging message exist within the PDSCH resource. The random access response message and the paging message may be located in different resources within the PDSCH resource, or may be located in a same resource within the PDSCH resource. For example, the gNB may carry both the random access response message and the paging message in a code division multiplexing manner.

A PDCCH may be scrambled by a specific network identity, so that UE receiving the PDCCH can easily perform corresponding blind detection. A manner of scrambling the PDCCH may be specifically scrambling a cyclic redundancy check (Cyclic Redundancy Check, CRC) code of transmission content in the PDCCH by a network identity, which may be alternatively understood as that the PDCCH is addressed to (addressed to) the network identity. For example, a CRC code of transmission content in the first part of the resource of the PDCCH may be scrambled by a network identity used for random access, for example, an RA-RNTI, and a CRC code of transmission content in the second part of the resource of the PDCCH may be scrambled by a network identity used for paging, for example, a P-RNTI or a new air interface P-RNTI. Alternatively, a CRC code of transmission content in the PDCCH may be scrambled by a predetermined network identity, for example, a new air interface P-RNTI.

It should be noted that FIG. 10 is merely an example, and relative time-domain/frequency-domain positions of a PDCCH and a PDSCH are not limited in an actual implementation process.

The gNB may send the random access response message on a plurality of downlink transmit beams through sweeping, and sends the paging message only on a beam that is reported by a to-be-paged terminal device through beam reporting. As shown in FIG. 10, an example in which the gNB includes a beam 1, a beam 2, a beam 3, and a beam 4 is used for description. If the gNB determines that terminal devices report the beam 1 to the beam 4 in a manner of sending a preamble sequence on a PRACH resource, that is, the beam 1 to the beam 4 are beams that can be used by the gNB for performing downlink transmission with corresponding terminal devices and that are determined by some terminal devices, and beams reported by to-be-paged terminal devices (including the LIE #1) by using the foregoing method include only the beam 1, the beam 2, and the beam 4, that is, only the beam 1, the beam 2, and the beam 4 are beams that can be used by the gNB for performing downlink transmission with corresponding terminal devices and that are determined by some to-be-paged terminal devices, the gNB sends the random access response message on the beam 1 to the beam 4, and sends the paging message only on the beam 1, the beam 2, and the beam 4, thereby saving downlink resources of a system.

Alternatively, the gNB may send the random access response message and the paging message only on the beam 1, the beam 2, and the beam 4. Whether to send a random access response message on a downlink transmit beam other than a downlink transmit beam reported by a terminal is not limited in this application.

It should be noted that a terminal device other than a to-be-paged terminal device may alternatively not perform a beam reporting procedure of sending a preamble sequence on a PRACH resource, and perform only a conventional random access procedure. In this case, the gNB may directly send a random access response message to the terminal device on a plurality of downlink transmit beams.

Figure 11:
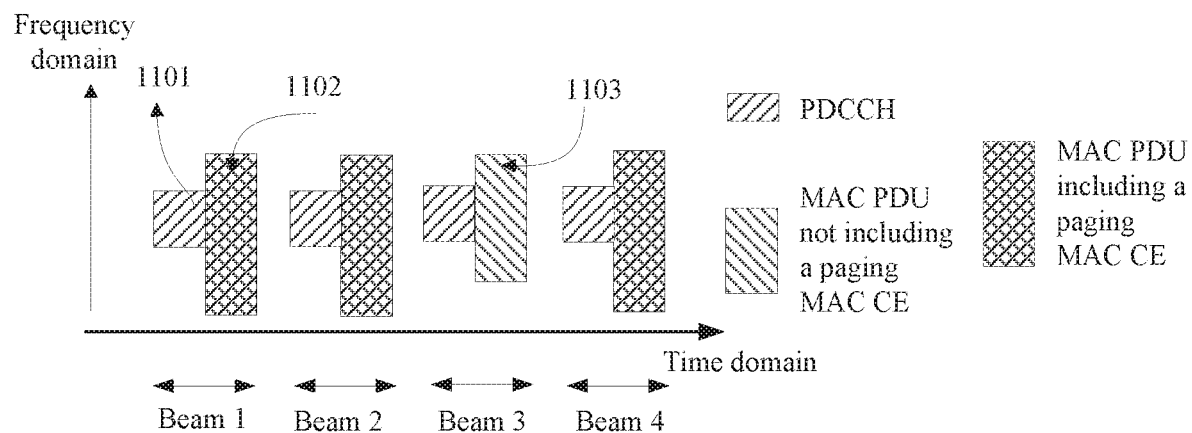
FIG. 11 is a schematic diagram of another type of resource allocation.

For another example, FIG. 11 is a schematic diagram of another type of resource allocation. The schematic diagram of the resource allocation shown in FIG. 11 may be corresponding to the manner 2 in step S330. In other words, the random access response message and the paging message are carried in a same MAC PDU. As shown in FIG. 11, the random access response message and the paging message use a same PRACH resource, that is, 1102 in FIG. 11. Correspondingly, a PDCCH resource shown in FIG. 11, that is, 1101, transmits downlink resource allocation information corresponding to 1102.

For example, the PDCCH in which the downlink resource allocation information is located may be scrambled by a corresponding RA-RNTI. It should be noted that the PDCCH in which the downlink resource allocation information is located may be scrambled by another specific network identity, for example, scrambled by a P-RNTI or a new air interface P-RNTI or another predetermined network identity. A person skilled in the art may understand that scrambling a PDCCH by a network identity may be understood as scrambling a CRC code of transmission content in the PDCCH. It should be noted that FIG. 11 is merely an example, and relative time-domain/frequency-domain positions of a PDCCH and a PDSCH are not limited in an actual implementation process.

As shown in FIG. 11, the gNB may send the random access response message on a plurality of downlink transmit beams through sweeping, and sends the paging message only on a beam that is reported by a to-be-paged terminal device through beam reporting, that is, includes a paging MAC CE only in a MAC PDU that is transmitted on the beam reported by the to-be-paged terminal device through beam reporting. An example in which the gNB includes a beam 1, a beam 2, a beam 3, and a beam 4 is used for description. If the gNB determines that terminal devices report the beam 1 to the beam 4 in a manner of sending a preamble sequence on a PRACH resource, that is, the beam 1 to the beam 4 are beams that can be used by the gNB for performing downlink transmission with corresponding terminal devices and that are determined by some terminal devices, and beams reported by to-be-paged terminal devices by using the foregoing method include only the beam 1, the beam 2, and the beam 4, that is, only the beam 1, the beam 2, and the beam 4 are beams that can be used by the gNB for performing downlink transmission with corresponding user equipments and that are determined by some to-be-paged terminal devices (including the UE #1), the gNB sends the random access response message on the beam 1 to the beam 4, and sends the paging message only on the beam 1, the beam 2, and the beam 4, that is, includes a paging MAC CE in a MAC PDU, thereby saving downlink resources of a system.

Alternatively, the gNB may send the random access response message and the paging message only on the beam 1, the beam 2, and the beam 4. Whether to send a random access response message on a downlink transmit beam other than a downlink transmit beam reported by a terminal device is not limited in this application.

It should be noted that a terminal device other than a to-be-paged terminal device may alternatively not perform a beam reporting procedure of sending a preamble sequence on a PRACH resource, and perform only a conventional random access procedure. In this case, the gNB may directly send a random access response message to the terminal device on a plurality of downlink transmit beams.

S350: The UE #1 determines the allocated uplink resource based on the random access response message, and determines, based on the paging message, that the UE #1 is paged.

For example, the UE #1 may detect, by using a specific network identity, for example, an RA-RNTI, a P-RNTI, a new air interface P-RNTI, or a predetermined network identity, whether the PDCCH includes the downlink resource allocation information of the random access response message and the paging message. If determining that the PDCCH is addressed to the specific network identity, the UE #1 may further obtain the downlink resource allocation information included in the PDCCH. A person in the art may understand that determining that the PDCCH is addressed to the specific network identity may be alternatively understood as determining that a CRC code of transmission content of the PDCCH is scrambled by the specific network identity. For a specific process thereof, refer to related content in 3GPP TS 36.213. Details are not described herein.

After obtaining the downlink resource allocation information of the random access response message and the paging message, the UE #1 may decode content in the corresponding PDSCH to obtain the random access response message and the paging message.

Determining the allocated uplink resource based on the random access response message may be specifically that the UE #1 monitors whether the UE #1 receives an RAR whose included random access preamble identifier matches (or referred to as "is corresponding to") the preamble sequence transmitted by the UE #1. If the RAR is successfully received, the UE #1 determines that the gNB allocates an uplink resource to the UE #1. Further, the UE #1 may parse a MAC RAR in a MAC payload corresponding to the RAP ID to obtain a UL grant, and determines the allocated uplink transmission resource based on the UL grant.

A person skilled in the art may understand that the UE #1 may further adjust an uplink transmit time based on a TAC in the RAR to compensate for a transmission delay, so as to be aligned with a receive window within which uplink transmission of another UE #1 arrives at the gNB.

In this embodiment of this application, determining, by the UE #1 based on the paging message, that the UE #1 is paged may be specifically: determining, by the UE #1, whether a first identifier of the UE #1 matches the first identification information in the paging message; and if the first identifier of the UE #1 matches the first identification information in the paging message, determining that the UE #1 is paged. For example, when the first identifier of the UE #1 and the first identification information meet one of the following described (1) to (4), the UE #1 may determine that the first identifier of the UE #1 matches the first identification information in the paging message:

(1) the first identification information is an S-TMSI, the first identifier is an S-TMSI of the UE #1, and the S-TMSI of the UE #1 is identical to one of at least one S-TMSI of the one or more to-be-paged UEs #1;

(2) the first identification information is an IMSI, the first identifier is an IMSI of the UE #1, and the IMSI of the UE #1 is identical to one of at least one IMSI of the one or more to-be-paged UEs #1;

(3) the first identification information is a third identifier generated based on an S-TMSI and according to a first algorithm, the first identifier is an S-TMSI of the UE #1, and a fourth identifier generated based on the S-TMSI of the UE #1 and according to the first algorithm is identical to one of at least one third identifier of the one or more to-be-paged UEs #1, where the first algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto; and (4) the first identification information is a fifth identifier generated based on an IMSI and according to a second algorithm, and a sixth identifier generated based on an IMSI of the UE #1 and according to the second algorithm is identical to any one of at least one fifth identifier of the one or more to-be-paged UEs #1, where the second algorithm may be one or a combination of more of algorithms such as a hash algorithm, a truncation algorithm, a modulo algorithm, a transpose algorithm, an inter-number system conversion algorithm, a plaintext-combined algorithm, a splicing algorithm, and a juxtaposition algorithm. This application is not limited thereto.

It should be noted that the first identification information and the first identifier may alternatively be another NAS identifier used for the paging process, and this application is not limited thereto.

S360: The UE #1 sends a second identifier to the gNB.

Specifically, the second identifier is sent on the uplink resource indicated by the uplink resource indication information (that is, the UL grant). The second identifier may be carried in a message 3 (or referred to as a Msg 3) of a random access procedure.

For example, the second identifier may be a NAS identifier of the UE #1. Alternatively, the second identifier may be an S-TMSI of the UE #1. Alternatively, the second identifier may be a random number generated by the UE #1. For example, the second identifier is a random number determined by the UE #1 from 0 to 240-1. Alternatively, the second identifier may be an IMSI of the UE #1. Alternatively, the second identifier may be a cell radio network temporary identifier of the UE #1.

Optionally, the second identifier may be carried in a common control channel service data unit (Common Control Channel Service Data Unit, CCCH SDU) or a C-RNTI MAC CE, or carried in other manners such as an RRC message, a MAC CE, or DCI. This is not limited in this application.

S370: The gNB determines, based on the second identifier, that the UE #1 is a to-be-paged terminal device.

For example, if the gNB determines, based on the second identifier, that the paging message is successfully received by the UE #1, the gNB may determine that the UE #1 is a to-be-paged terminal device. In other words, if determining that a terminal device responds to the paging message, the gNB determines that the UE #1 is a terminal device that needs to be paged.

For example, if determining that the second identifier matches a NAS identifier of a to-be-paged terminal device, an S-TMSI of a to-be-paged terminal device, an IMSI of a to-be-paged terminal device, a cell radio network temporary identifier of a to-be-paged terminal device, or one of random numbers generated by a to-be-paged terminal device, the gNB determines that the UE #1 is a to-be-paged terminal device.

For another example, the gNB may send the second identifier or information generated based on the second identifier to a core network device (for example, an MME). If receiving a confirmation message sent by the core network device, the gNB may determine that the UE #1 is a to-be-paged terminal device.

For still another example, the gNB may send a trigger message to a core network device, where the trigger message instructs the core network device to send paging identification information of a to-be-paged terminal device; and then receive a confirmation message from the core network device, where the confirmation message includes paging identification information of at least one to-be-paged terminal device. If the second identifier matches one piece of the paging identification information of the at least one to-be-paged terminal device, the gNB determines that the UE #1 is a to-be-paged terminal device.

The paging identification information may be, for example, an S-TMSI, an IMSI, a third identifier generated based on an S-TMSI and according to the first algorithm, or a fifth identifier generated based on an IMSI and according to the second algorithm. For details about how the second identifier matches one piece of the paging identification information of the at least one to-be-paged terminal device, refer to related content in S350 about how the first identifier matches the first identification information. For brevity, details are not described herein again.

S380: The gNB sends first indication information to the UE #1, where the first indication information may be used by the UE #1 for determining to complete random access.

Optionally, in a first possible implementation, the first indication information may include a UE contention resolution identifier.

In this case, the first indication information may be carried in a UE contention resolution identifier MAC control element (UE Contention Resolution Identity MAC control element).

Further, the first indication information may be a terminal device contention resolution identifier whose value is the second identifier of the UE #1.

Optionally, in a second possible implementation, the first indication information may be a PDCCH scrambled by the second identifier.

A person skilled in the art may understand that scrambling a PDCCH by the second identifier may be understood as scrambling a CRC code of content in the PDCCH by the second identifier.

Optionally, in a third possible implementation, the first indication information may be a PDCCH scrambled by the second identifier, and the PDCCH further includes uplink resource indication information used for new transmission.

S590: The UE #1 determines, based on the first indication information, to complete random access. It should be noted that determining, by the UE #1, to complete a random access procedure may be alternatively understood as determining, by the UE #1, that contention resolution succeeds.

Optionally, corresponding to the first possible implementation in S580, if determining that a UE contention resolution identifier in a UE contention resolution identifier MAC control element matches the second identifier sent by the UE #1, the UE #1 determines to complete random access. For example, if the second identifier sent by the UE #1 is carried in a CCCH SDU, and the second identifier occupies the first 48 bits, the UE #1 determines whether the UE contention resolution identifier matches the first 48 bits in the CCCH SDU. If the UE contention resolution identifier matches the first 48 bits in the CCCH SDU, the UE #1 determines to complete random access.

Optionally, corresponding to the second possible implementation in S580, if determining that the PDCCH is addressed (Addressed to) the second identifier, the UE #1 determines to complete random access. For example, when the second identifier is a C-RNTI, if determining that the PDCCH is addressed to the second identifier, the UE #1 determines to complete random access.

Optionally, corresponding to the third possible implementation in S580, if determining that the PDCCH is addressed to the second identifier, and the PDCCH includes the uplink resource indication information used for new transmission, the UE #1 determines to complete random access.

Optionally, the determining, by the UE #1 based on the first indication information, to complete a random access procedure includes: receiving, by the UE #1, a first cell radio network temporary identifier sent by the gNB; and if a user equipment contention resolution identifier included in the first indication information matches the second identifier of the UE #1, setting, by the UE #1, the first cell radio network temporary identifier as the cell radio network temporary identifier of the UE #1, and determining to complete the random access procedure.

For example, if the second identifier sent by the UE #1 is carried in a CCCH SDU, and the second identifier occupies the first 48 bits, the UE #1 determines whether the UE contention resolution identifier matches the first 48 bits in the CCCH SDU. If the UE contention resolution identifier matches the first 48 bits in the CCCH SDU, the UE #1 sets the first cell radio network temporary identifier as the cell radio network temporary identifier of the UE #1, and determines to complete the random access procedure. Further, the first cell radio network temporary identifier may be carried in the random access response message sent by the gNB.

A person skilled in the art may understand that, that the PDCCH is addressed to the second identifier may be understood as that a CRC code of content of the PDCCH is scrambled by the second identifier.

Therefore, according to the random access method in this embodiment of this application, a terminal device reports a beam by using a PRACH resource or a preamble sequence, receives a paging message in a subsequent process, determines that the terminal device is paged, and after determining that the terminal device is paged, may continue to complete a random access procedure. Compared with the prior art in which a terminal device initiates a random access procedure after determining that the terminal device is paged, this method can speed up the random access procedure of the paged UE, thereby reducing a transmission delay and signaling overheads. On the other hand, a network device sends the paging message only on the beam reported by the terminal device, instead of sending the paging message on each beam through sweeping, thereby reducing resource overheads used by the network device for sending the paging message.

It should be noted that the physical channel resource described in this application and a corresponding transmission channel resource or a corresponding logical channel resource may replace each other. For example, the PRACH may be alternatively replaced with an RACH resource. Information described in the foregoing embodiment of this application may be one or more of transmission content, a transport block, a message, a signal, energy, a waveform, a bit, and the like. In this application, that a terminal device sends information (or a message) to a network device may be any one of that user equipment sends information to a network device, that user equipment broadcasts information to a network device, and that user equipment multicasts information to a network device. In this application, that a network device sends information to a terminal device may be any one of that a network device sends information to a terminal device, that a network device broadcasts information to a terminal device, and that a network device multicasts information to a terminal device. Reception described in the foregoing embodiment of this application may be obtaining one or more of transmission content, information, a signal, energy, a waveform, a transport block, a bit, and the like. The UE in the foregoing embodiment of this application may be arbitrarily replaced with a terminal device or a terminal. The gNB in the foregoing embodiment of this application may be replaced with any network device, for example, a TRP or a cell. In an actual implementation process, a physical channel listed in the foregoing embodiment of this application may be adaptively replaced with a newly defined physical channel. For example, a PRACH listed in the foregoing embodiment of this application may be a new air interface random access channel, for example, an NR-PRACH, or may be a physical channel used for performing beam reporting, for example, a beam random access channel (Beam Random Access Channel, BRACH); the PDCCH listed in the foregoing embodiment of this application may be any physical channel carrying resource scheduling information, for example, may be a new air interface downlink control channel, for example, an NR-PDCCH; or the PDSCH listed in the foregoing embodiment of this application may be any physical channel carrying data, for example, may be a new air interface downlink shared channel, for example, an NR-PDSCH. This is not limited in this application.

It should be further noted that for ease of description, a part of a description used in this application is based on the existing 3GPP standard, but however, a person skilled in the art may understand that in an actual implementation process, a related description in this application, for example, a term or a procedure, may be correspondingly replaced with a related description in new air interface. For example, the NAS identifier in this application may be correspondingly replaced with a non-access stratum identifier in new air interface; the RA-RNTI in this application may be correspondingly replaced with an RA-RNTI in new air interface; the random access procedure in this application may be correspondingly replaced with a random access procedure in new air interface; and the like. Procedures performed by the gNB or UE (for example, the UE #1) in this embodiment of this application may be specifically implemented by different internal functional entities and/or interfaces based on division of labor, for example, a PHY layer, a MAC layer, an RRC layer, and an S1 interface.

The foregoing describes the random access method according to this application in detail with reference to FIG. 1 to FIG. 11. The following describes a terminal device and a network device in this application.

Figure 12:
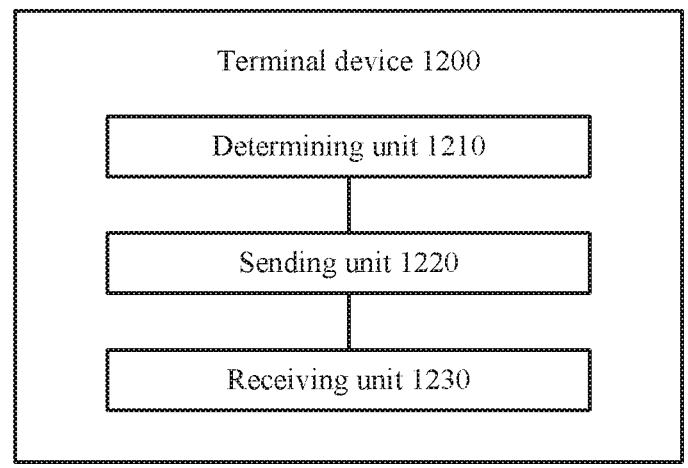
FIG. 12 is a schematic block diagram of a terminal device according to this application.

FIG. 12 is a schematic block diagram of a terminal device 1200 according to an embodiment of this application. As shown in FIG. 12, the terminal device 1200 includes a determining unit 1210, a sending unit 1220, and a receiving unit 1230.

The determining unit 1210 is configured to determine a physical channel resource and a preamble sequence, where the physical channel resource and/or the preamble sequence are/is associated with a first beam that can be used by a network device for performing downlink transmission with the terminal device and that is determined by the terminal device.

The sending unit 1220 is configured to send the preamble sequence to the network device on the physical channel resource.

The receiving unit 1230 is configured to receive a random access response message and a paging message that are sent by the network device, where the random access response message includes uplink resource indication information and a preamble identifier, the paging message includes first identification information of one or more to-be-paged terminal devices, and the paging message is sent on the first beam.

The sending unit 1220 is further configured to: When the preamble identifier is corresponding to the preamble sequence, and a first identifier of the terminal device matches the first identification information, send a second identifier of the terminal device to the network device, where the second identifier of the terminal device is sent on an uplink resource indicated by the uplink resource indication information.

The receiving unit 1230 is further configured to receive first indication information sent by the network device.

The determining unit 1210 is further configured to determine, based on the first indication information, to complete a random access procedure.

It should be understood that units in the terminal device 1200 are configured to perform actions or processing procedures performed by the UE #1 in the foregoing method, and therefore beneficial effects in the foregoing method embodiment can also be implemented. Herein, to avoid redundancy, a detailed description is omitted.

Figure 13:
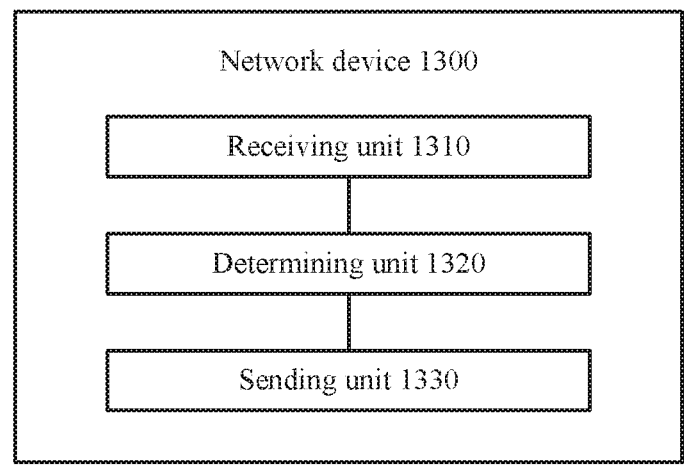
FIG. 13 is a schematic block diagram of a network device according to this application.

FIG. 13 is a schematic block diagram of a network device 1300 according to an embodiment of this application. As shown in FIG. 13, the network device 1300 includes a receiving unit 1310, a determining unit 1320, and a sending unit 1330.

The receiving unit 1310 is configured to receive, on a physical channel resource, a preamble sequence sent by a terminal device.

The determining unit 1320 is configured to determine, based on the physical channel resource and/or the preamble sequence, a first beam that can be used for performing downlink transmission with the terminal device.

The sending unit 1330 is configured to send a random access response message and a paging message to the terminal device, where the random access response message includes uplink resource indication information and a preamble identifier, the paging message includes first identification information of one or more to-be-paged terminal devices, and the paging message is sent on the first beam.

The receiving unit 1310 is further configured to: when the preamble identifier is corresponding to the preamble sequence, and a first identifier of the terminal device matches the first identification information, receive a second identifier sent by the terminal device, where the second identifier of the terminal device is sent on an uplink resource indicated by the uplink resource indication information.

The determining unit 1320 is further configured to determine, based on the second identifier, that the terminal device is a to-be-paged terminal device.

The sending unit 1330 is further configured to send first indication information to the terminal device, where the first indication information is used by the terminal device for determining to complete a random access procedure.

It should be understood that units in the network device 1300 are configured to perform actions or processing procedures performed by the gNB in the foregoing method, and therefore beneficial effects in the foregoing method embodiment can also be implemented. Herein, to avoid redundancy, a detailed description is omitted.

Figure 14:
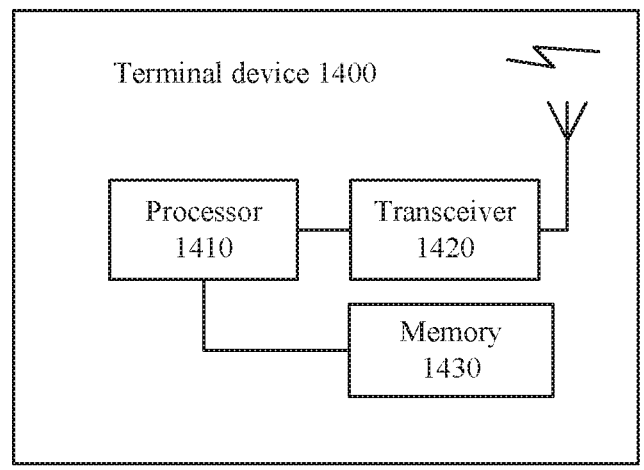
FIG. 14 is a schematic block diagram of a terminal device according to this application.

FIG. 14 is a schematic block diagram of a terminal device 1400 according to an embodiment of this application. As shown in FIG. 14, the terminal device 1400 includes a processor 1410 and a transceiver 1420. The transceiver 1420 includes a transmitter and a receiver.

The processor 1410 is configured to determine a physical channel resource and a preamble sequence, where the physical channel resource and/or the preamble sequence are/is associated with a first beam that can be used by a network device for performing downlink transmission with the terminal device and that is determined by the terminal device.

The transceiver 1420 is configured to: send the preamble sequence to the network device on the physical channel resource; receive a random access response message and a paging message that are sent by the network device, where the random access response message includes uplink resource indication information and a preamble identifier, the paging message includes first identification information of one or more to-be-paged terminal devices, and the paging message is sent on the first beam; when the preamble identifier is corresponding to the preamble sequence, and a first identifier of the terminal device matches the first identification information, send a second identifier of the terminal device to the network device, where the second identifier of the terminal device is sent on an uplink resource indicated by the uplink resource indication information; and receive first indication information sent by the network device.

The processor 1410 is further configured to determine, based on the first indication information, to complete a random access procedure.

Further, the terminal device 1400 may further include a memory 1430, configured to store a corresponding program (may also be referred to as an instruction) and data for the processor to invoke to implement a corresponding function. The processor may invoke the program and the data that are stored in the memory, and may control the transceiver 1420, to implement a function performed by the UE #1 in the method embodiment of this application.

There may be one or more processors 1410, one or more transceivers 1420, and one or more memories 1430. The processor 1410, the transceiver 1420, and the memory 1430 communicate with each other by using an internal connection channel, to transfer a control signal and/or a data signal.

Figure 15:
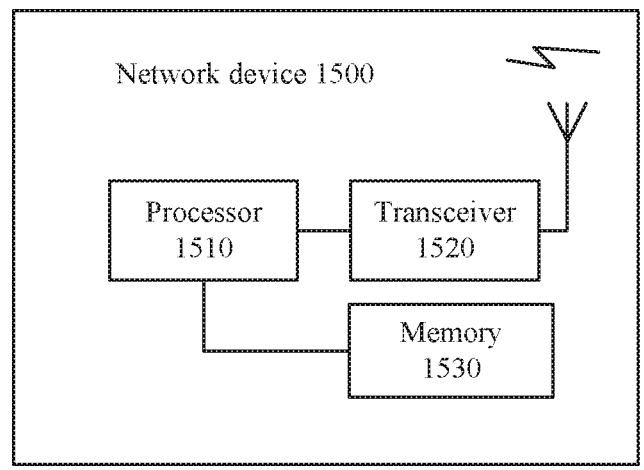
FIG. 15 is a schematic block diagram of a network device according to this application.

FIG. 15 is a schematic block diagram of a network device 1500 according to an embodiment of this application. As shown in FIG. 15, the network device 1500 includes a processor 1510 and a transceiver 1520. The transceiver 1520 includes a transmitter and a receiver.

The transceiver 1520 is configured to receive, on a physical channel resource, a preamble sequence sent by a terminal device.

The processor 1510 is configured to determine, based on the physical channel resource and/or the preamble sequence, a first beam that can be used for performing downlink transmission with the terminal device.

The transceiver 1520 is further configured to send a random access response message and a paging message to the terminal device, where the random access response message includes uplink resource indication information and a preamble identifier, the paging message includes first identification information of one or more to-be-paged terminal devices, and the paging message is sent on the first beam; and when the preamble identifier is corresponding to the preamble sequence, and a first identifier of the terminal device matches the first identification information, receive a second identifier sent by the terminal device, where the second identifier of the terminal device is sent on an uplink resource indicated by the uplink resource indication information.

The processor 1510 is further configured to determine, based on the second identifier, that the terminal device is a to-be-paged terminal device.

The transceiver 1520 is further configured to send first indication information to the terminal device, where the first indication information is used by the terminal device for determining to complete a random access procedure.

Further, the network device 1500 may further include a memory 1530, configured to store a corresponding program (may also be referred to as an instruction) and data for the processor to invoke to implement a corresponding function. The processor may invoke the program and the data that are stored in the memory, and may control the transceiver 1520, to implement a function performed by the gNB in the method embodiment of this application.

There may be one or more processors 1510, one or more transceivers 1520, and one or more memories 1530. The processor 1510, the transceiver 1520, and the memory 1530 communicate with each other by using an internal connection channel, to transfer a control signal and/or a data signal.

An embodiment of this application further provides a communications system. The system includes the terminal device and the network device in the foregoing embodiments.

It should be understood that, the processor mentioned in the embodiments of this application may be a central processing unit (Central Processing Unit, CPU), or the processor may be another general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, a discrete gate or a transistor logic device, a discrete hardware component, or the like. The general purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct ramous random access memory (Direct Rambus RAM, DR RAM).

It should be noted that when the processor is a general purpose processor, a DSP, an SIC, an FPGA, or another programmable logic device, a discrete gate or a transistor logic device, or a discrete hardware component, the memory (a storage module) is integrated in the processor.

It should be noted that the memory described in this specification is intended to include, but is not limited to, these memories and any other memory of a suitable type.

It should be further understood that "first", "second", and various numbers in this specification are used merely for distinguishing for ease of description, and are not intended to limit the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean an execution order in various embodiments of this application. The execution order of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for detailed working processes of the foregoing described system, apparatus, and unit, reference may be made to corresponding processes in the foregoing method embodiment, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the method described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or a compact disc.

Related parts between the method embodiments of this application may be cross-referred. The apparatuses provided in the apparatus embodiments are used to perform the methods provided in corresponding method embodiments. Therefore, each apparatus embodiment may be understood with reference made to a related part in a related method embodiment.

A structural apparatus diagram provided in each apparatus embodiment of this application shows only a simplified design of a corresponding apparatus. In actual application, the apparatus may include any quantity of transmitters, any quantity of receivers, any quantity of processors, any quantity of memories, and the like, to implement a function or an operation performed by the apparatus in each apparatus embodiment of this application, and all apparatuses that can implement this application fall within the protection scope of this application.

A name of a message/a frame/indication information, a module, a unit, or the like provided in the embodiments of this application is merely an example, and another name may be used, provided that a function of the message/the frame/the indication information, the module, the unit, or the like is the same.

The terms used in the embodiments of this application are merely for the purpose of illustrating specific embodiments, and are not intended to limit this application. The terms "a" and "the" of singular forms used in the embodiments and the appended claims of this application are also intended to include plural forms, unless otherwise specified in the context clearly. It should also be understood that, the term "and/or" used in this specification indicates and includes any or all possible combinations of one or more associated listed items. The character "/" in this specification usually indicates an "or" relationship between the associated objects.

Depending on the context, for example, a word "if" used herein may be explained as "while" or "when" or "in response to determining" or "in response to detection". Similarly, depending on the context, a phrase "if determining" or "if detecting (a stated condition or event)" may be explained as "when determining" or "in response to determining" or "when detecting (the stated condition or event)" or "in response to detecting (the stated condition or event)".

A person of ordinary skill in the art may understand that all or some of the steps of the method in the foregoing embodiments may be implemented by a program instructing related hardware. The program may be stored in a readable storage medium, in a device, such as a FLASH memory or an EEPROM. When the program is executed, the program performs all or some of the steps described above.

In the foregoing specific implementations, the objective, technical solutions, and beneficial effects of this application are further described in detail. It should be understood that different embodiments may be combined. The foregoing descriptions are merely specific implementations of this application, but are not intended to limit the protection scope of this application. Any combination, modification, equivalent replacement, improvement, or the like made without departing from the spirit and principle of this application should fall within the protection scope of this application.

What is claimed is:

1. A network device, comprising:
a receiver configured to receive, on a physical channel resource, a preamble sequence from a terminal device;
a processor coupled to the receiver and configured to determine, based on the physical channel resource or the preamble sequence, a first beam that is capable of performing downlink transmission with the terminal device; and
a transmitter coupled to the processor and configured to:
send a random access response message and a paging message to the terminal device, wherein the random access response message comprises uplink resource indication information and a preamble identifier, wherein the paging message comprises first identification information of one or more to-be-paged terminal devices, and wherein the paging message is sent on the first beam; and
send a second identifier or information generated based on the second identifier to a core network device,
wherein the receiver is further configured to:
receive the second identifier from the terminal device when the preamble identifier corresponds to the preamble sequence and a first identifier of the terminal device matches the first identification information, wherein the second identifier of the terminal device is sent on an uplink resource indicated by the uplink resource indication information; and
receive a confirmation message from the core network device, wherein the confirmation message indicates that the terminal device is a to-be-paged terminal device,
wherein the processor is further configured to determine, based on the second identifier and the confirmation message, that the terminal device is the to-be-paged terminal device, and
wherein the transmitter is further configured to send first indication information to the terminal device to enable the terminal device to determine to complete a random access procedure.

2. The network device of claim 1, wherein the first identification information comprises:
a system architecture evolution (SAE)-temporary mobile subscriber identity (S-TMSI);
an international mobile subscriber identity (IMSI);
information generated based on the S-TMSI and according to a first algorithm; or
information generated based on the IMSI and according to a second algorithm.

3. The network device of claim 1, wherein the processor is further configured to determine that the terminal device is the to-be-paged terminal device when the second identifier matches one of at least one non-access stratum (NAS) identifier, at least one system architecture evolution (SAE)-temporary mobile subscriber identity (S-TMSI), at least one international mobile subscriber identity (IMSI) of the one or more to-be-paged terminal devices, a cell radio network temporary identifier (C-RNTI), or one of one or more random numbers generated by the one or more to-be-paged terminal devices.

4. The network device of claim 1, wherein the first indication information comprises a user equipment contention resolution identifier that matches the second identifier of the terminal device, wherein the first indication information is scrambled by the second identifier of the terminal device, or wherein the first indication information is scrambled by the second identifier of the terminal device and comprises uplink resource indication information used for new transmission.

5. The network device of claim 1, wherein the transmitter is further configured to send the random access response message and the paging message in a same media access control (MAC) protocol data unit (PDU).

6. The network device of claim 5, wherein a MAC subheader corresponding to the paging message comprises a seventh identifier, and wherein the processor is further configured to generate the seventh identifier based on a paging radio network temporary identifier (P-RNTI).

7. A computer program product comprising computer-executable instructions stored on a non-transitory computer-readable medium that, when executed by a processor, cause a network device to:
- receive, on a physical channel resource, a preamble sequence from a terminal device;
- determine, based on the physical channel resource or the preamble sequence, a first beam that is capable of performing downlink transmission with the terminal device;
- send a random access response message and a paging message to the terminal device, wherein the random access response message comprises uplink resource indication information and a preamble identifier, wherein the paging message comprises first identification information of one or more to-be-paged terminal devices, and wherein the paging message is sent on the first beam;
- send a second identifier or information generated based on the second identifier to a core network device;
- receive the second identifier from the terminal device when the preamble identifier corresponds to the preamble sequence and a first identifier of the terminal device matches the first identification information, wherein the second identifier of the terminal device is sent on an uplink resource indicated by the uplink resource indication information;
- receive a confirmation message from the core network device, wherein the confirmation message indicates that the terminal device is a to-be-paged terminal device;
- determine, based on the second identifier and the confirmation message, that the terminal device is the to-be-paged terminal device; and
- send first indication information to the terminal device to enable the terminal device to determine to complete a random access procedure.

8. The computer program product of claim 7, wherein the first identification information comprises a system architecture evolution (SAE)-temporary mobile subscriber identity (S-TMSI).

9. The computer program product of claim 7, wherein the first identification information comprises an international mobile subscriber identity (IMSI).

10. The computer program product of claim 7, wherein the first identification information comprises information generated based on a system architecture evolution (SAE)-temporary mobile subscriber identity (S-TMSI) and according to a first algorithm.

11. The computer program product of claim 7, wherein the first identification information comprises information generated based on an international mobile subscriber identity (IMSI) and according to a second algorithm.

12. The computer program product of claim 7, wherein the instructions further cause the network device to determine that the terminal device is the to-be-paged terminal device when the second identifier matches one non-access stratum (NAS) identifier.

13. The computer program product of claim 7, wherein the instructions further cause the network device to determine that the terminal device is the to-be-paged terminal device when the second identifier matches at least one system architecture evolution (SAE)-temporary mobile subscriber identity (S-TMSI).

14. The computer program product of claim 7, wherein the instructions further cause the network device to determine that the terminal device is the to-be-paged terminal device when the second identifier matches at least one international mobile subscriber identity (IMSI) of the one or more to-be-paged terminal devices.

15. The computer program product of claim 7, wherein the instructions further cause the network device to determine that the terminal device is the to-be-paged terminal device when the second identifier matches a cell radio network temporary identifier (C-RNTI).

16. The computer program product of claim 7, wherein the instructions further cause the network device to determine that the terminal device is the to-be-paged terminal device when the second identifier matches one of one or more random numbers generated by the one or more to-be-paged terminal devices.

17. The computer program product of claim 7, wherein the first indication information comprises a user equipment contention resolution identifier that matches the second identifier of the terminal device.

18. The computer program product of claim 7, wherein the first indication information is scrambled by the second identifier of the terminal device.

19. The computer program product of claim 7, wherein the first indication information is scrambled by the second identifier of the terminal device and comprises uplink resource indication information used for new transmission.

20. The computer program product of claim 7, wherein the instructions further cause the network device to:
- send the random access response message and the paging message in a same media access control (MAC) protocol data unit (PDU), wherein a MAC subheader corresponding to the paging message comprises a seventh identifier; and
- generate the seventh identifier based on a paging radio network temporary identifier (P-RNTI).

* * * * *

UNITED STATES PATENT AND TRADEMARK OFFICE
CERTIFICATE OF CORRECTION

PATENT NO. : 11,395,331 B2  
APPLICATION NO. : 16/628898  
DATED : July 19, 2022  
INVENTOR(S) : Xiaoxian Li et al.

Page 1 of 1

It is certified that error appears in the above-identified patent and that said Letters Patent is hereby corrected as shown below:

On the Title Page

Page 2, References Cited, Other Publications, Line 15: "3GPP TS 36.304, 714.3.0, Jun. 2017, 49 pages." should read "3GPP TS 36.304, V14.3.0, Jun. 2017, 49 pages."

Signed and Sealed this
Eleventh Day of October, 2022

Katherine Kelly Vidal
*Director of the United States Patent and Trademark Office*